(12) United States Patent
Hirotsune

(10) Patent No.: US 6,449,078 B1
(45) Date of Patent: Sep. 10, 2002

(54) OPTICAL RECEIVER, METHOD FOR OPTICAL TRANSMISSION IN SPACE, OPTICAL TRANSMITTING IN SPACE APPARATUS AND METHOD FOR OPTICAL TRANSMISSION

(75) Inventor: Satoshi Hirotsune, Settsu (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/129,310

(22) Filed: Aug. 5, 1998

(30) Foreign Application Priority Data

| Aug. 5, 1997 | (JP) | 9-211042 |
| Nov. 7, 1997 | (JP) | 9-305691 |

(51) Int. Cl.⁷ .............................................. H04B 10/06
(52) U.S. Cl. ...................... 359/189; 359/194; 375/345; 375/360
(58) Field of Search ................................ 359/189, 194; 375/345, 360

(56) References Cited

U.S. PATENT DOCUMENTS

| 4,431,916 A | * 2/1984 | Couch .................... 250/214 R |
| 5,828,476 A | * 10/1998 | Bonebright et al. ......... 359/152 |
| 5,864,591 A | * 1/1999 | Holcombe ................... 375/345 |

FOREIGN PATENT DOCUMENTS

| JP | 01208920 | 8/1989 |
| JP | 08097870 | 4/1996 |

* cited by examiner

*Primary Examiner*—Leslie Pascal
*Assistant Examiner*—Hanh Phan
(74) *Attorney, Agent, or Firm*—Ratner & Prestia

(57) ABSTRACT

An optical receiver of the present invention comprises a photodiode receiving an optical signal and converting it into an electric signal, a signal edge detector generating an edge signal from the electric signal, a quantizing circuit generating a signal quantized on the basis of the edge signal, and a variable gain amplifier amplifying an output signal from the photodiode so that the amplitude of the edge signal may become constant, and has the structure of an output signal of the variable gain amplifier being inputted to the quantizing circuit. In addition, a spatial optical transmitter has the structure of making a transmission band twice by using polarized light mutually orthogonal.

4 Claims, 15 Drawing Sheets

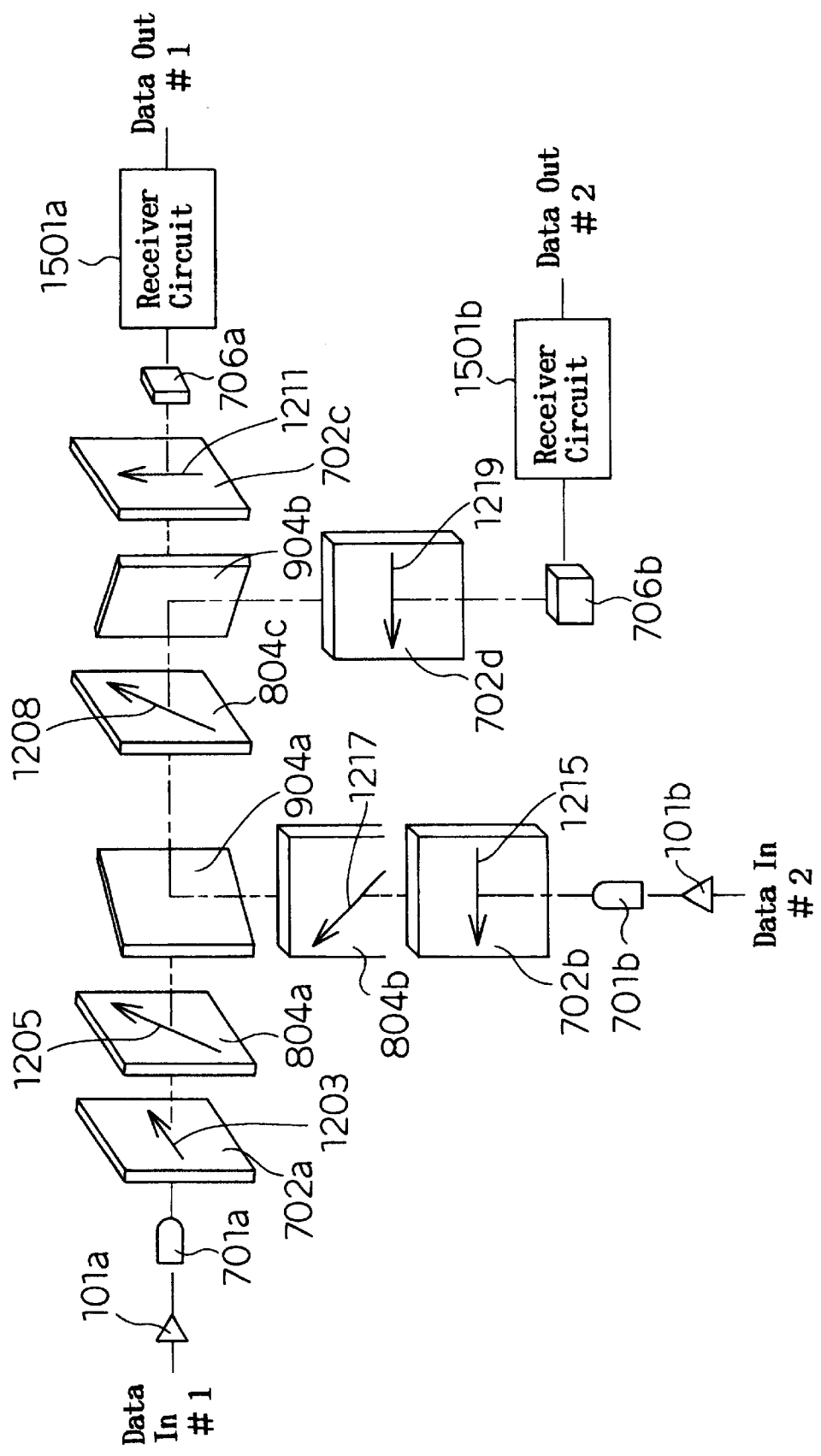

OPTICAL RECEIVER, METHOD FOR OPTICAL TRANSMISSION IN SPACE, OPTICAL TRANSMITTING IN SPACE APPARATUS AND METHOD FOR OPTICAL TRANSMISSION

BACKGROUND OF THE INVENTION

1. Technical Field

The present invention relates to an optical receiver, a spatial optical transmission method, a spatial optical transmitter, and an optical transmission method, which use light as a medium.

2. Background Art

Recently, wireless devices have been increased, and there among optical transmitters using light as a transmission medium of data have been increased.

As shown as an IrDA receiver in Denshi-Gijutu Dec. p. 30 (1996), a receiver of a conventional optical transmitter is composed of a photodiode, an amplifier, and a comparator, and an optical signal is converted into an electric signal by the photodiode and is amplified by the amplifier to be quantized by the comparator.

This type of structure has such a defect that an error arises or a jitter arises because quantization is failed in the capacitor due to a dull waveform instead of rectangular pulses to be obtained if response speed of an LED and the photodiode that are used in the transmitter is not sufficient to a signal transmitted.

Then, normally, the LED and photodiode that are sufficiently high-speed to the signal transmitted are used. Nevertheless, in case large volume of data such as images is transmitted at high-speed, there is such a task that it becomes necessary to have a transmission band that is faster than or equal to the response speed of the LED and photodiode.

In addition, if it is attempted to perform plural system of data transmission on the same optical path in the conventional structure, jamming arises due to optical interference. For this reason, there is another task that it is impossible to extend the transmission band with the method of multiplexing the plural system of data on the same optical path.

DISCLOSURE OF INVENTION

An object of the present invention, in consideration of such conventional tasks, is to provide an optical receiver, a spatial optical transmission method, a spatial optical transmitter, and an optical transmission method, which can widen a transmission band width of a data communication using light as an medium.

The first invention of the present invention is an optical receiver comprising a photoelectric conversion means receiving an optical signal and converting the optical signal into an electric signal, a signal edge detecting means detecting edge information from said converted electric signal, a quantizing means generating signal quantized on the basis of said detected edge signal, an amplification factor changing means amplifying an output signal from said photoelectric conversion means with a predetermined amplification factor, and a signal level detecting means detecting a signal level of an output of said signal edge detecting means and controlling said amplification factor on the basis of the detection result, wherein the output signal of said amplification factor changing means is inputted to said quantizing means.

Owing to this, for example, it becomes possible to reduce the effect of degradation of a signal caused by a light-emitting device and a light-receiving device and to widen the transmission bandwidth.

A further aspect of the present invention is a spatial optical transmission method that is a spatial optical transmission method for transmitting data through spatially emitting light, wherein said method is for transmitting two lines of data transmission on the substantially same optical path with using linearly-polarized light whose polarized directions are orthogonal to each other.

Another aspect of the present invention is a spatial optical transmission method that is a spatial optical transmission method for transmitting data through spatially emitting light, wherein said method is for transmitting two lines of data transmission on the substantially same optical path with using circularly-polarized light respective rotational directions of polarization of which are reverse. polarized-beam-splitting means.

A still further aspect of the present invention is an optical transmission method that is an optical transmission method for transmitting data with using light, wherein said method is for simultaneously transmitting different lines of data on the practically same optical path with using linearly-polarized light the polarized directions of which are orthogonal to each other or circularly-polarized light the rotational directions of which are reverse to each other.

Owing to this, it becomes possible to multiplex two systems of data transmission on the practically same optical path and to widen the transmission bandwidth.

BRIEF DESCRIPTION OF DRAWINGS

FIG. 15 is a schematic structural drawing of a spatial optical transmitter in a twelfth embodiment of the present invention.

REFERENCE NUMERALS

Figure 1:
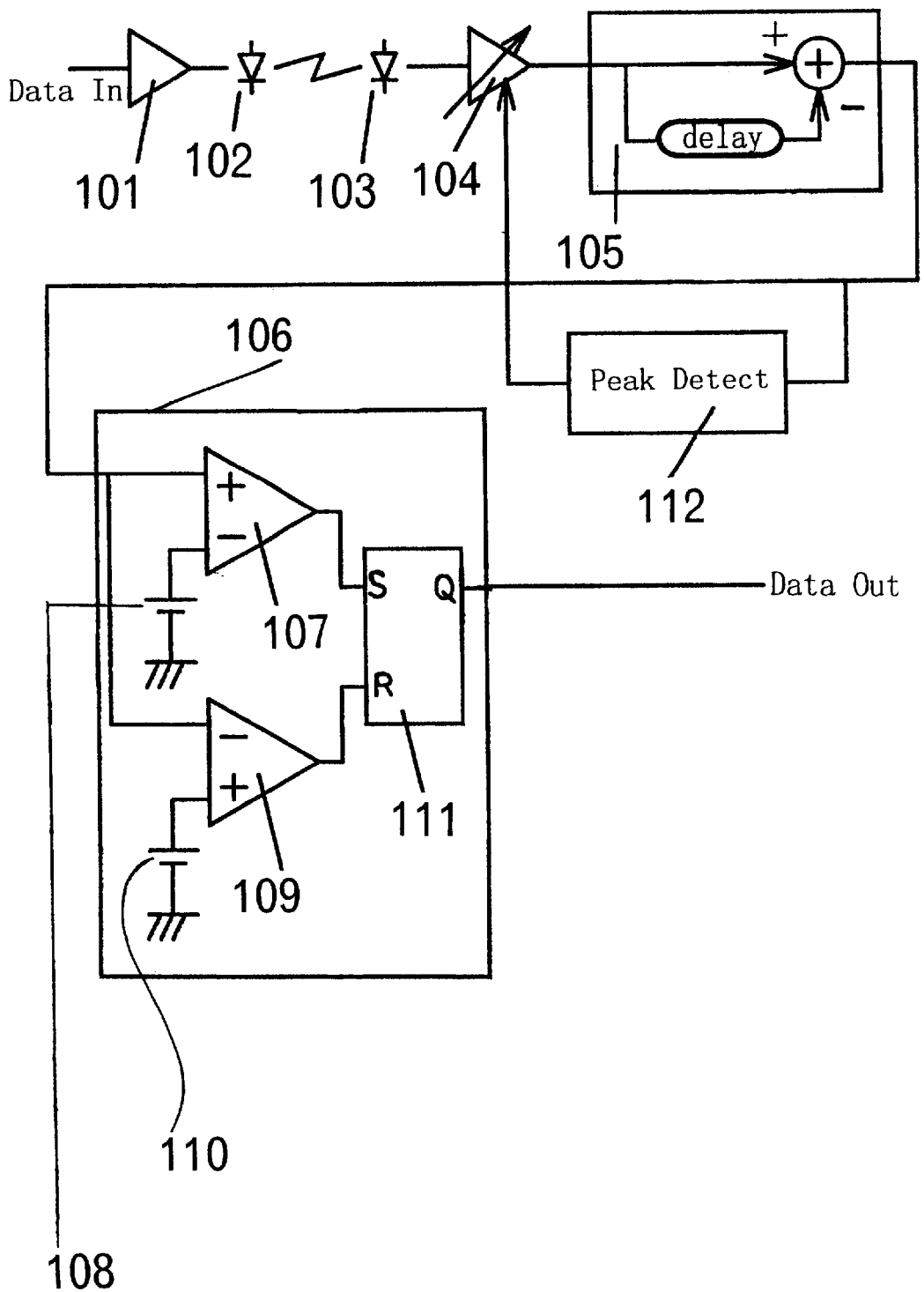
FIG. 1 is a structural drawing of an optical transmitter according to a first embodiment of the present invention.

101 LED driver
102 Light-emitting diode (LED)
103 Photodiode
104 Variable gain amplifier
105 Edge detector
106 Quantizing circuit
107 Comparator
108 Reference voltage
09 Comparator
110 Reference voltage
111 SR-FF
112 Peak detector
201 Transmission waveform
202 Output waveform of LED driver
203 Output waveform of variable gain amplifier
204 Output waveform of edge detector
205 Reference voltage for leading edge detection
206 Reference voltage for trailing edge detection
207 Leading edge pulse
208 Trailing edge pulse
209 Quantized output waveform
313 Clock reproducing circuit
314 Synchronization signal detector
316 D-FF
409 Quantized output waveform
410 Resampling clock
411 Reproduced waveform
506 AD converter
507 Quantizing circuit
508 Sign judging circuit
509 SR-FF
605 Sampling clock
606 Output data of AD converter
607 Leading edge pulse
608 Trailing edge pulse
609 Reproduced waveform
701a, 701b Light-emitting diodes
702a, 702b Polarizers
702d Analyzer
702c Analyzer (First analyzer)
703 Polarization axis of polarizer 702a
705 Polarization axis of the analyzer 702c
706a Photodiode
709 Polarization axis of polarizer 702b
711 Polarization axis of analyzer 702d
706a, 706b Photodiodes
802a Polarizer (corresponding to a first polarizer of the present invention)
803 Polarization axis of analyzer 802a 804a, 804b, 804d λ/4 plate
804 Lag axis of λ/4 plate 804a
804c λ/4 plate
807 Lag axis of λ/4 plate 804c
809 Polarization axis of analyzer 702c
813 Polarization axis of polarizer 702b
815 Lag axis of λ/4 plate 804b
817 Lag axis of λ/4 plate 804d
819 Polarization axis of analyzer 702d
903 Polarization axis of polarizer 702a
904 Half mirror
905 Polarized beam splitter
909 Plarization axis of polarizer 702b
1103 Polarization axis of 701b polarizer
1105 Lag axis of λ/4 plate 804a
1108 Lag axis of λ/4 plate 804c
1113 Plarization axis of 702b polarizer
Lag axis of λ/4 plate 804b

BEST MODE FOR CARRYING OUT THE INVENTION

Hereinbelow, embodiments of the present invention will be described with reference to drawings.

FIRST EMBODIMENT

Figure 2:
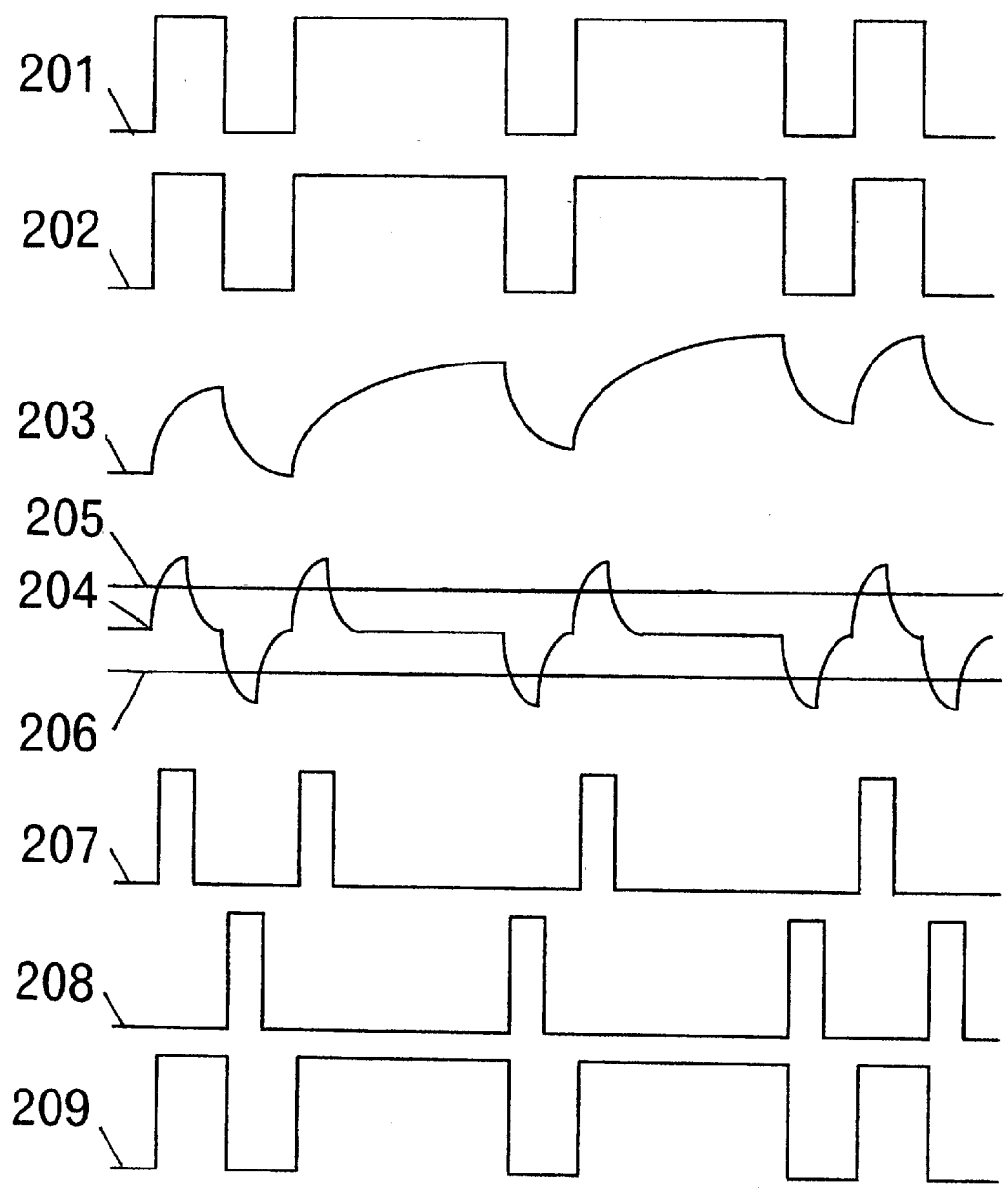
FIG. 2 is a chart showing signal waveforms of the optical transmitter according to the first embodiment of the present invention.

FIG. 1 is a structural drawing showing an example of a spatial optical transmitter of image data that is a spatical transmitter in a first embodiment of the present invention, and FIG. 2 is a chart showing signal waveforms of respective blocks thereof.

As shown in FIG. 1, numeral 101 shows an LED driver, 102 does a light-emitting diode (LED) as an electrooptic conversion means, 103 does a photodiode as a photoelectric conversion means, 104 does a variable gain amplifier as an amplification factor-changing means, 105 does an edge detector as a signal edge detection means, 106 does a quantizing circuit as a quantizing means, 107 does comparator, 108 does a reference voltage, 109 does a comparator, 110 does a reference voltage, 111 does an SR-FF, and 112 does a peak detector as a signal level detection means.

As shown in FIG. 2, numeral 201 shows a transmission waveform, 202 does an output waveform of the LED driver, 203 does an output waveform of the variable gain amplifier, 204 does an output waveform of the edge detector, 205 does a reference voltage for leading edge detection, 206 does a reference voltage for trailing edge detection, 207 does leading edge pulses, 208 does trailing edge pulses, and 209 does a quantized output waveform.

The transmission waveform 201 is a serial data train to be transmitted, and, in this embodiment, a device is produced at 100 Mbps. The serial data train of transmission waveform 201 is amplified by the LED driver 101, and an output waveform of the LED driver 101 is applied to the LED 102. An LED for infrared communication having 50 MHz of cutoff frequency is used as the 102 LED. In addition, 101 LED driver is not necessary in case even small LED drive power is allowable.

The emitted light of the 102 LED is received by the 103 photodiode and is amplified by the 104 light-receiving amplifier, but, mainly due to limitation of response speed of the 102 light-emitting diode and 103 photodiode, a waveform is degraded as the output waveform of the 203 light-receiving amplifier (see FIG. 2). A PIN photodiode having 70 MHz of cutoff frequency is used as the 103 photodiode. The 103 variable gain amplifier is composed of two stages of variable gain amplifiers having −11 dB through −31 dB and 90 MHz of bandwidth.

Next, edge detection of the output of the 103 variable gain amplifier is performed by the 105 edge detector, and the 204 output waveform of the edge detector is obtained.

The 112 peak detector detects a peak value of the 204 output waveform of the edge detector, and controls the gain of the 104 variable gain amplifier with the output to keep the output amplitude of the 204 edge detector constant. This is for preventing an amplitude change of the output waveform of the 204 edge detector from bringing the failure of the 107 comparator and 109 comparator pulsing edge information because a light-receiving state of the 103 photodiode changes due to a change of transmission distance, a shift of an optical axis, or the like.

In addition, a structure of not providing the peak detector 112 is conceivable. Nevertheless, it becomes necessary to perform severe adjustment of the optical axis of the 102 LED and 103 photodiode if this peak detector 112 does not exist, limitation of fixing the transmission distance becomes necessary, and hence practical use becomes difficult. Therefore, in case necessity of the above limitation is not cared, the structure with omitting the peak detector 112 can be used. This point is also the same as that in embodiments described below.

This embodiment, as shown in FIG. 1, uses a delay line and an adder in the edge detector 105 to perform edge detection by subtracting a delayed signal (not shown) from an original signal (namely, the output waveform of the light-receiving amplifier, 203). The circuit using the delay line and adder can obtain an edge waveform having smaller distortion than a differential circuit using a resistor and a capacitor. In consequence, it becomes possible to perform data transmission in a wider band.

At this time, although an edge detection signal having large amplitude can be obtained if delay time of the delay line is lengthened, jitter at the time of quantization becomes large.

On the contrary, if the delay time is shortened, the jitter becomes small, but the amplitude of the edge signal becomes small, and hence this is disadvantageous in the viewpoint of the SIN and the like.

In this embodiment, the delay time is set at 5 ns which gave the best result of the total performance in experiments. In this stage, fluctuation of a mean voltage generated due to limitation of response speed of the light-emitting diode and 103 photodiode is removed, and further edge information that is comparatively resistive to degradation caused by the response speed is extracted among degraded waveforms. Then, this waveform is quantized by the 106 quantizing circuit.

The 106 quantization circuit separately detects leading edges and trailing edges, synthesizes them, and reproduces a transmission waveform.

The detailed operation of the 106 quantization circuit is as follows.

Thus, by comparing the 204 output waveform of the edge detector with the 209 reference voltage of the 205 reference voltage level, the 207 leading edge pulse is obtained at the 207 comparator output. Similarly, by comparing the 204 output waveform of the edge detector with the 110 reference voltage of the 206 reference voltage level, the 208 trailing edge pulse is obtained at the 109 comparator output. These are synthesized by the 111 SR-FF, and the 209 reproduced waveform is obtained as an output.

Even the data in a high-speed rate where a conventional system might generate a bit error, according to this embodiment, can be transmitted with using an LED and a photodiode that have slow response speed. Owing to this, limitation relating to the LED and photodiode that is the narrowest bottleneck in the high-speed optical transmission is relieved to be able to realize a higher-speed optical transmitter.

SECOND EMBODIMENT

Figure 3:
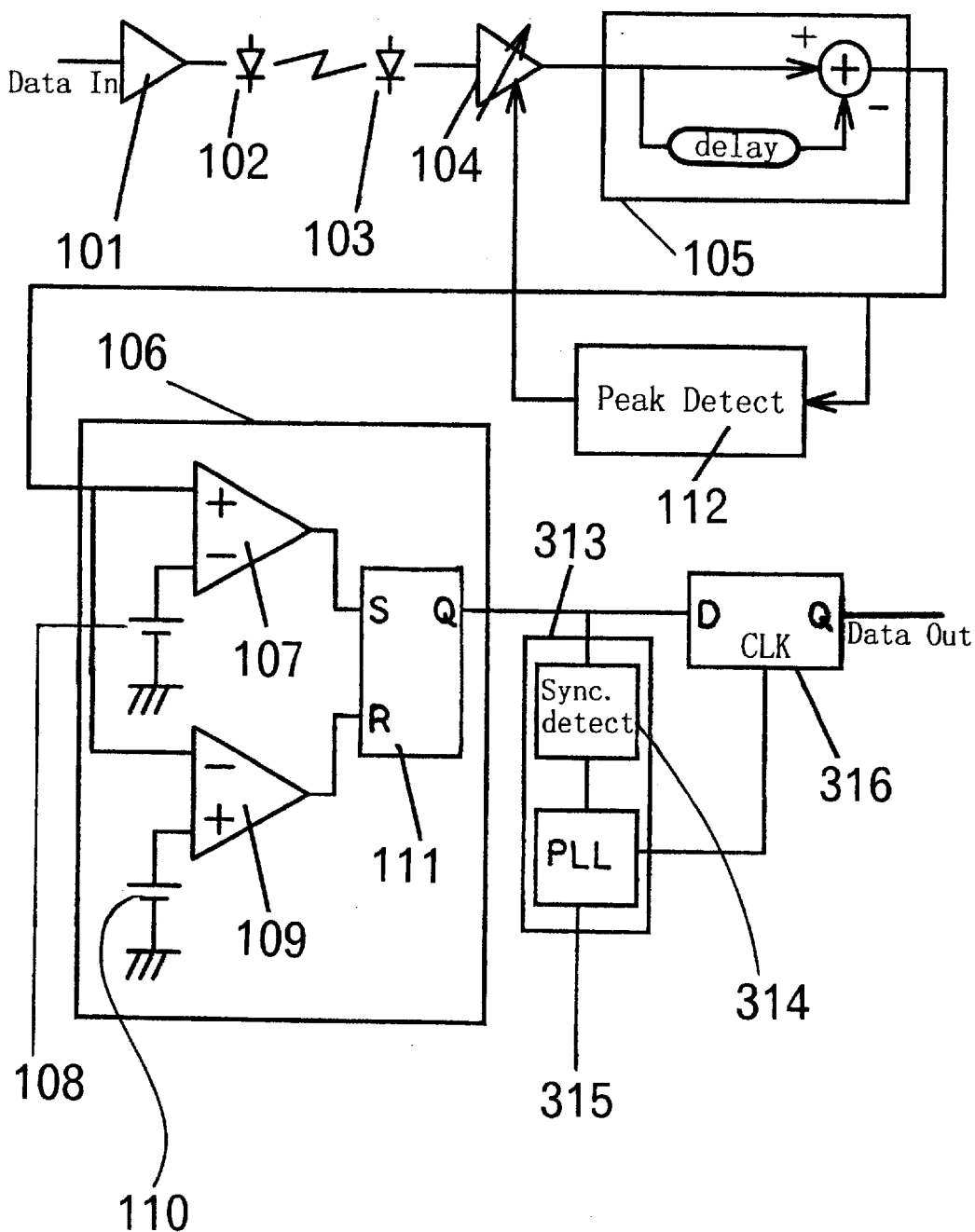
FIG. 3 is a structural drawing of an optical transmitter according to a second embodiment of the present invention.
Figure 4:
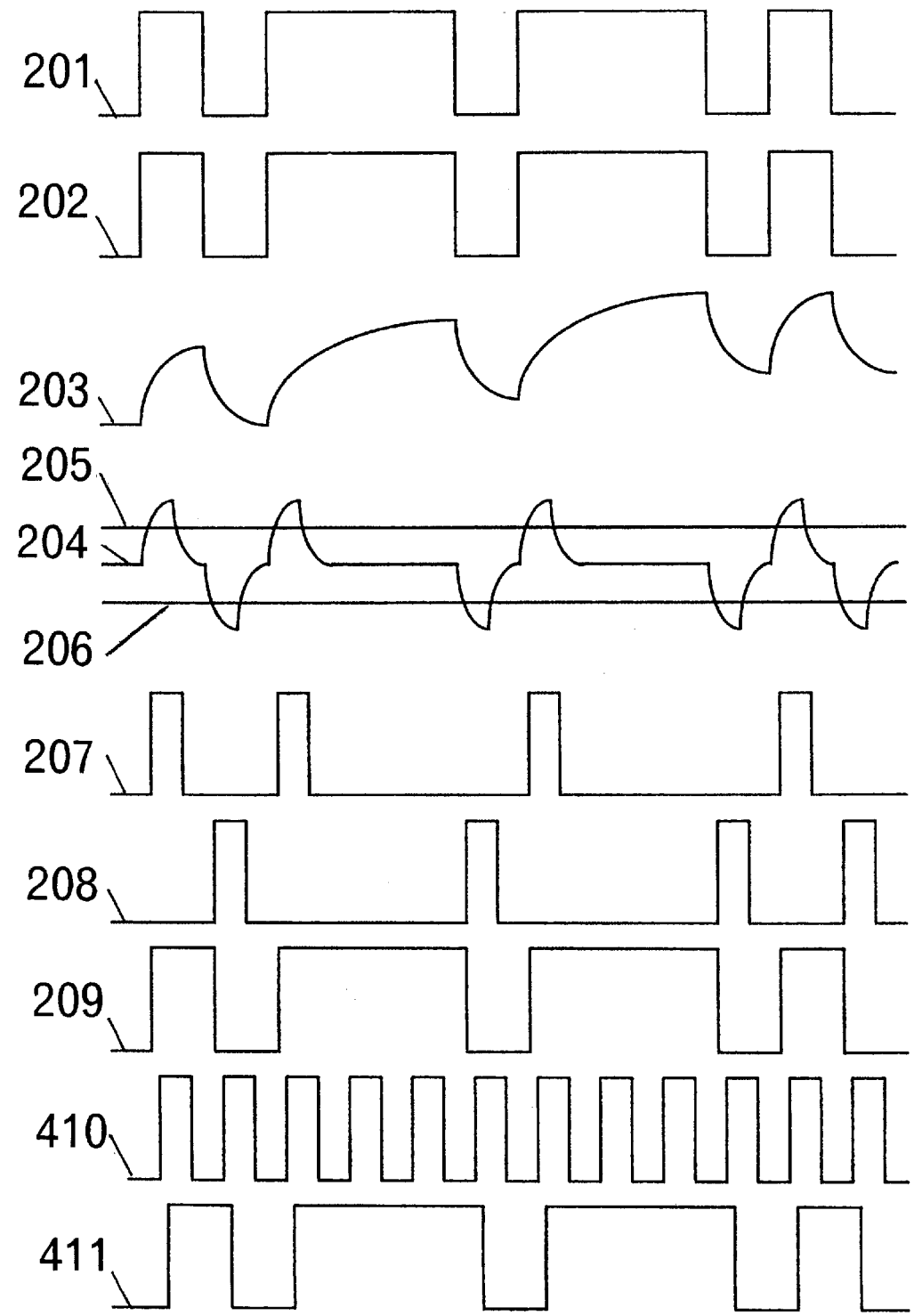
FIG. 4 is a chart showing signal waveforms of the optical transmitter according to the second embodiment of the present invention.

FIG. 3 is a diagram showing an example of a digital data transmitter that is an optical transmitter in a second embodiment of the present invention, and FIG. 4 is a chart of its respective signal waveforms.

In FIG. 3, numeral 101 shows the LED driver, 102 does the light-emitting diode as the electrooptic conversion means, 103 does the photodiode as the photoelectric conversion means, 104 does the variable gain amplifier as the amplification factor-changing means, 105 does the edge detector as the signal edge detection means, 106 does the quantizing circuit as the quantizing means, 107 does the comparator, 108 does the reference voltage, 109 does the comparator, 110 does the reference voltage, and 111 does the SR-FF, 112 does the peak detector as the signal level detection means, 313 does a clock reproducing circuit as a clock reproducing means, 314 does a synchronization signal detector, 315 does a PLL, and 316 does a D-FF as a resampling means. In FIG. 4, numeral 101 shows the transmission waveform, 102 does the output waveform of the LED driver, 103 does the output waveform of the variable gain amplifier, 104 does the output waveform of the edge detector, 105 does the reference voltage for leading edge detection, 106 does the reference voltage for trailing edge detection, 107 does leading edge pulses, 108 does trailing edge pulses, 409 does a quantized output waveform, 410 does a resampling clock, and 411 does a reproduced waveform.

The LED driver 101 through SR-FF 111 in FIG. 3 have the same circuit structure as the LED driver 101 through SR-FF 111 that are described in the first embodiment and are shown in FIG. 1. In addition, respective waveforms to which numerals 201 through 209 are assigned in FIG. 4 are the same as respective waveforms which are shown in FIG. 2 and are described in the first embodiment, and to which numerals 201 through 209 are assigned in FIG. 2.

In case transmitted data such as binary images is used without resampling, the structure described in the first embodiment is used as it is. Nevertheless, in case the transmitted data is digitally processed, resampling is necessary. Then, in this embodiment, an embodiment where a resampling circuit is added will be shown.

A synchronization signal train is embedded in the transmitted data, this synchronization signal is detected by the 314 synchronization signal detector, and the sampling clock is reproduced by the 315 PLL circuit on the basis of that signal to be used as a resampling clock.

The synchronization signal train uses a bit pattern that never appear in normal data so as to distinguish the train from the normal data, and, in this embodiment, the synchronization signal train is included at the frequency of one time per 1024 samples.

In addition, it is possible to use a method of reproducing the clock from the data train itself without a specific synchronization signal.

The 411 reproduced waveform can be obtained by performing sampling with the 410 resampling clock with using the 316 D-FF. Since sampled data can be obtained, digital signal processing can be easily performed.

Even the data in a high-speed rate where a conventional system might generate a bit error, according to this embodiment, can be transmitted with using an LED and a photodiode that have slow response speed. Owing to this, limitation relating to the LED and photodiode that is the narrowest bottleneck in the high-speed optical transmission is relieved to be able to realize a higher-speed optical transmitter.

THIRD EMBODIMENT

Figure 5:
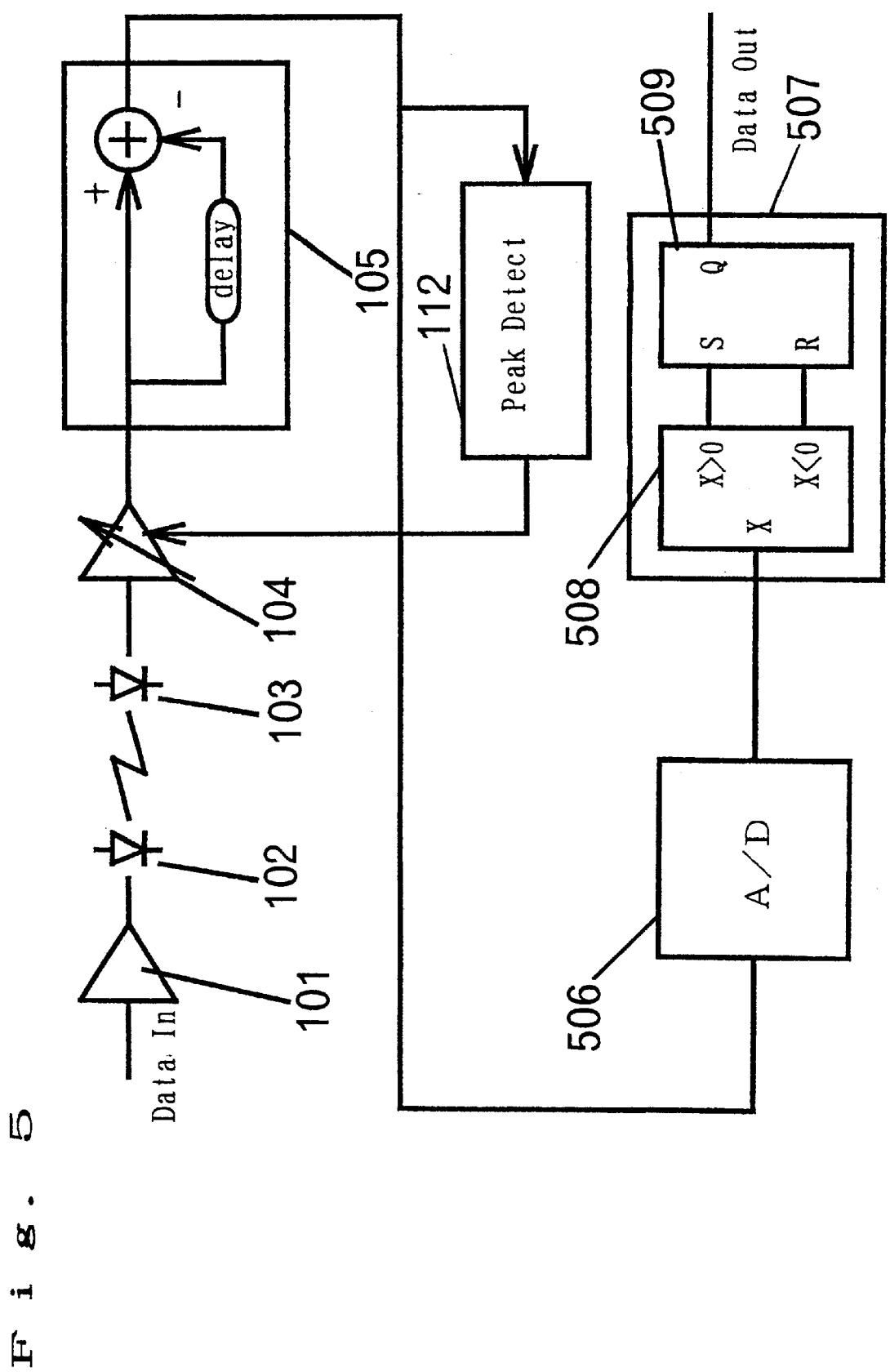
FIG. 5 is a structural drawing of an optical transmitter according to a third embodiment of the present invention.
Figure 6:
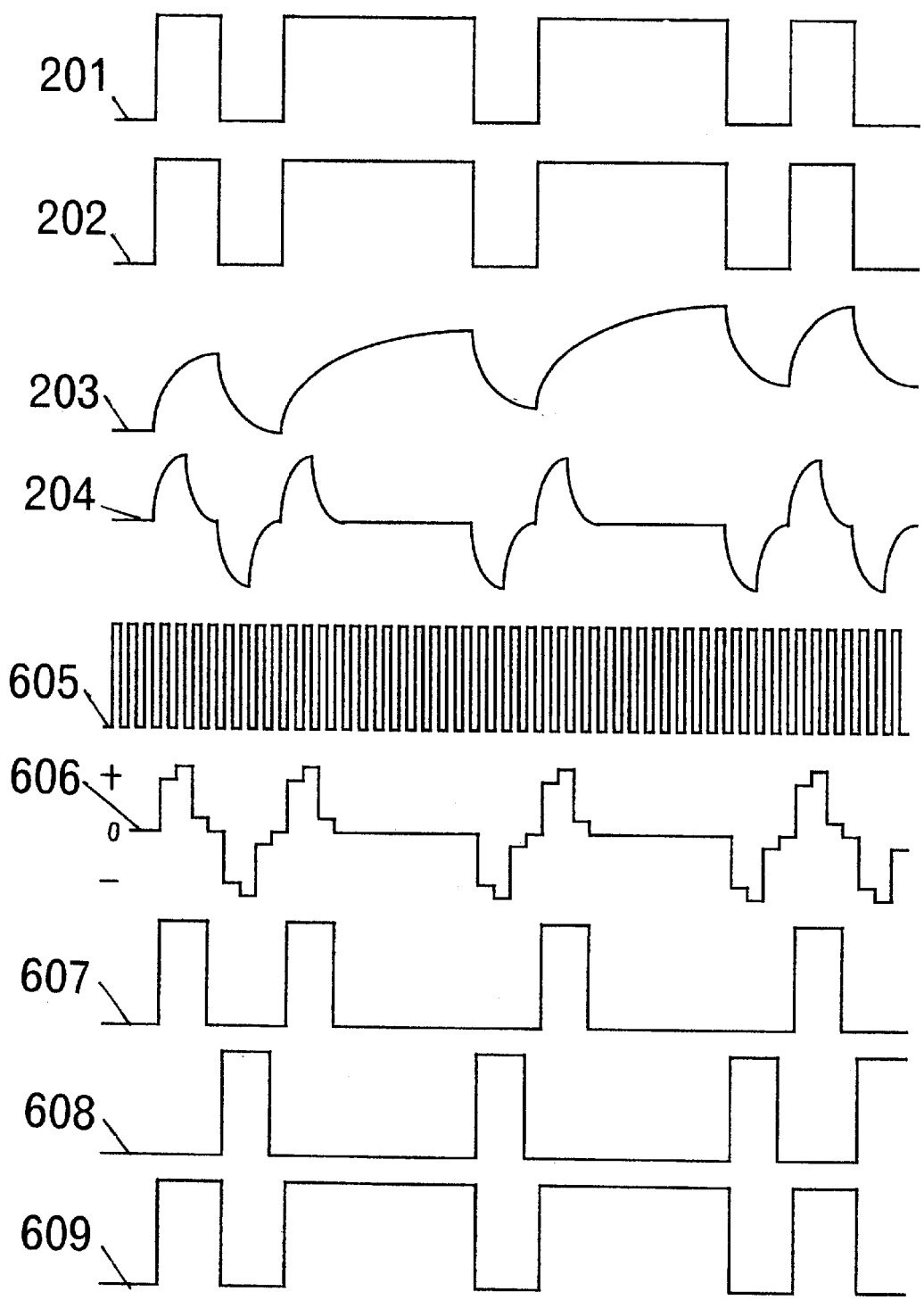
FIG. 6 is a chart showing signal waveforms of the optical transmitter according to the third embodiment of the present invention.

FIG. 5 is a diagram of an example of a digital data transmitter that is an optical transmitter in a third embodiment of the present invention, and FIG. 6 is a chart of its respective signal waveforms.

As for each processing in this embodiment, any of analog processing and digital processing can be performed except a photodiode as a photoelectric conversion means.

This embodiment is a case that the processing in the 106 quantization circuit that is described in the first embodiment is performed in the digital processing.

In FIG. 5, numeral 101 shows the LED driver, 102 does the light-emitting diode as the electrooptic conversion means, 103 does the photodiode as the photoelectric conversion means, 104 does the variable gain amplifier as the amplification factor-changing means, 105 does the edge detector as the signal edge detection means, 506 does an AD converter, 507 does a quantizing circuit as a quantizing means, 508 does a sign judging circuit, 509 does a SR-FF, and 112 does the peak detector as the signal level detection means.

In FIG. 6, numeral 201 shows the transmission waveform, 202 does the output waveform of the LED driver, 203 does the output waveform of the variable gain amplifier, 204 does the output waveform of the edge detector, 605 does a sampling clock, 606 does output data of the AD converter, 607 does leading edge pulses, 608 does trailing edge pulses, and 609 does a reproduced waveform.

The 201 transmission waveform is a serial data train and is amplified by the 101 LED driver, and the 202 output waveform of the LED driver is applied to the 102 LED. The 101 LED driver is not necessary in case even small LED drive power is allowable.

The emitted light of the 102 LED is received by the 103 photodiode and is amplified by the 104 variable gain amplifier, but, mainly due to limitation of response speed of the 102 light-emitting diode and 103 photodiode, a waveform is degraded as the 203 output waveform of the variable gain amplifier (see FIG. 2).

The 112 peak detector detects a peak value of the output waveform of the 105 edge detector, and controls the gain of the 104 variable gain amplifier with the output to keep the output amplitude of the 105 edge detector constant. This is for securing a signal level in the range of an input voltage that is suitable to the 506 AD converter even if a light-receiving state of the 103 photodiode changes due to a change of transmission distance, a shift of an optical axis, or the like.

Next, edge detection of the 203 output waveform of the variable gain amplifier is performed in the 105 edge detector, and the 204 output waveform of the edge detector is obtained. This example, as shown in FIG. 5, uses a delay line and an adder in the edge detector 105. In this stage, fluctuation of a mean voltage generated due to limitation of response speed of the 101 light-emitting diode and 103 photodiode is removed, and further edge information that is comparatively resistive to degradation caused by the response speed is extracted among degraded waveforms.

Next, the 204 output waveform of the edge detector is converted into a digital signal with the 106 AD converter. In addition, the frequency of the 205 sampling clock at this time should be sufficiently higher than the data rate of the 201 transmission waveform.

The 606 output data of the AD converter that is AD-converted is quantized in the 507 quantization circuit. The 507 quantization circuit separately detects leading edges and trailing edges, synthesized them, and reproduces a transmission waveform.

The detailed operation of the 507 quantization circuit is as follows.

Thus, whether the polarity of the 606 output data of the AD converter is positive or negative is judged by the 508 polarity judging circuit, the 607 leading edge pulse and 608 trailing edge pulse are detected, the pulses are synthesized by the 609 SR-FF, and the 609 reproduced waveform is obtained as an output. In addition, by giving the 608 polarity judging circuit a threshold value for separately judging the leading edge and trailing edge instead of judgment of the positive and negative polarity, noiseproof property increases.

In this embodiment, clock reproduction for which a PLL and the like is used is not necessary, further, complex signal processing can be adopted in the quantization circuit, and it is possible to construct a highly reliable circuit that is resistant to noise and distortion. Furthermore, although, generally, miniaturization and low cost can be desired, it is necessary to use a high-speed device since the frequency higher than the data transfer rate is necessary for the sampling clock.

Even the data in a high-speed rate where a conventional system might generate a bit error, according to this embodiment, can be transmitted with using an LED and a photodiode that have slow response speed. Owing to this, limitation relating to the LED and photodiode that is the narrowest bottleneck in the high-speed optical transmission is relieved to be able to realize a higher-speed optical transmitter.

FOURTH EMBODIMENT

Figure 7:
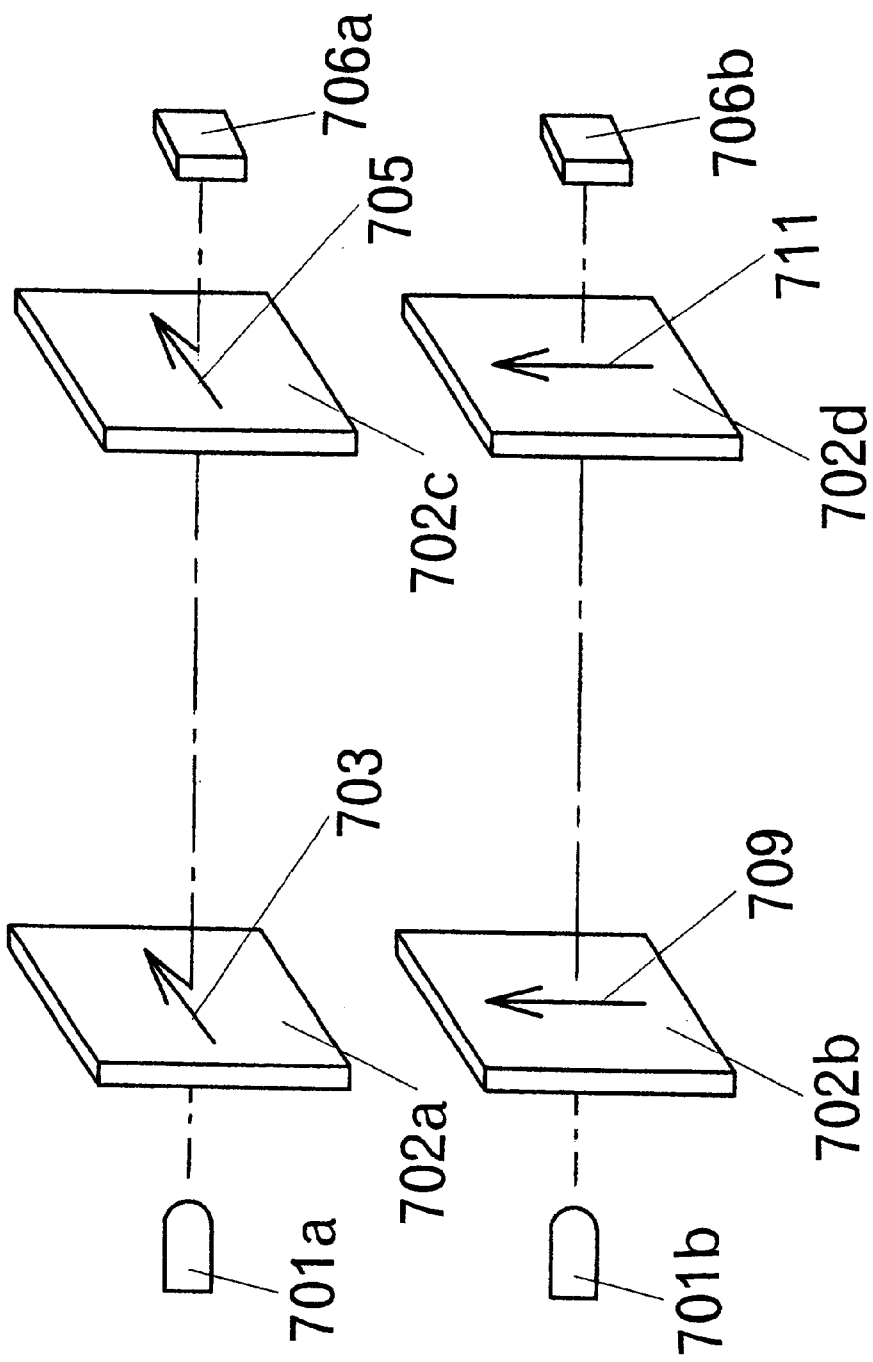
FIG. 7 is a structural drawing of a spatial optical transmitter according to a fourth embodiment of the present invention.

FIG. 7 is a schematic structural diagram of a spatial optical transmitter in a fourth embodiment of the present invention. In the diagram, symbol 701*a* shows a light-emitting diode as an electrooptic conversion means, 702*a* does a polarizer, 703 does a polarization axis of the polarizer 702*a*, 702*c* does an analyzer, 705 does a polarization axis of the analyzer 702*c*, 706*a* does a photodiode as a photoelectric conversion means, 701*b* does a light-emitting diode as an electrooptic conversion means, 702*b* does a polarizer, 709 does a polarization axis of the polarizer 702*b*, 702*d* does an analyzer, 711 does a polarization axis of the analyzer 702*d*, and 706*b* does a photodiode as a photoelectric conversion means.

In the above structure, next, operation of this embodiment will be described.

Thus, an electric signal applied to the light-emitting diode 701*a* is converted into light. Although the polarized directions of this light do not coincide, the light after passing through the polarizer 702*a* becomes linearly-polarized light since the polarizer 702*a* passes only the light vibrating in the direction of the polarization axis 703. Although the analyzer 702*c* passes only the light vibrating in the direction of the polarization axis 705, all of the above-described light passing through the polarizer 702*a* can pass through the analyzer 702*c* since the polarized directions of the light coincide with each other. In addition, the light passing through the analyzer 702*c* is converted into an electric signal by the photodiode 706*a*.

Next, the electric signal applied to the light-emitting diode 701*b* is converted into light. Although the polarized directions of this light do not coincide, the light after passing through the polarizer 702*b* becomes linearly-polarized light since the polarizer 702*b* passes only the light vibrating in the direction of the polarization axis 709. Although the analyzer 702*d* passes only the light vibrating in the direction of the polarization axis 711, all of the above-described light passing through the polarizer 702b can pass through the analyzer 702d since the polarized directions of the light coincide with each other. In addition, the light passing through the analyzer 702d is converted into an electric signal by the photodiode 706b.

Since optical axes of the light-emitting diode 701a and photodiode 706a, and optical axes of the light-emitting diode 701b and photodiode 706b coincide respectively, the light from them does not interfere with each other if the light is parallel light. Nevertheless, actually, it is difficult to make the optical axes completely coincide due to an installation error and the like, and it is difficult to obtain completely parallel light even with using a lens or a concave mirror if a laser is not used. Furthermore, it is necessary to carefully handle the laser since it had better being avoided that the laser light directly enters an eye in case laser light is spatially emitted. In addition, although it is good to make two optical axes close so as to make a device compact, interference of the light becomes more remarkable if the device is a conventional one.

Nevertheless, in this embodiment, even if the light passing through the polarizer 702a interferes with the light passing through the polarizer 701b, the interfered light is cut off by the analyzers 702c and 702d since respective polarized directions are orthogonal to each other.

Therefore, the electric signal applied to the light-emitting diode 701a and the electric signal applied to the light-emitting diode 701b are transmitted respectively to the photodiode 706a and photodiode 706b without interfering with each other.

Owing to this, it becomes possible to make two optical axes extremely close, and hence it becomes possible to multiplex two signals and to make the transmission band width of the data signal twice.

FIFTH EMBODIMENT

Figure 8:
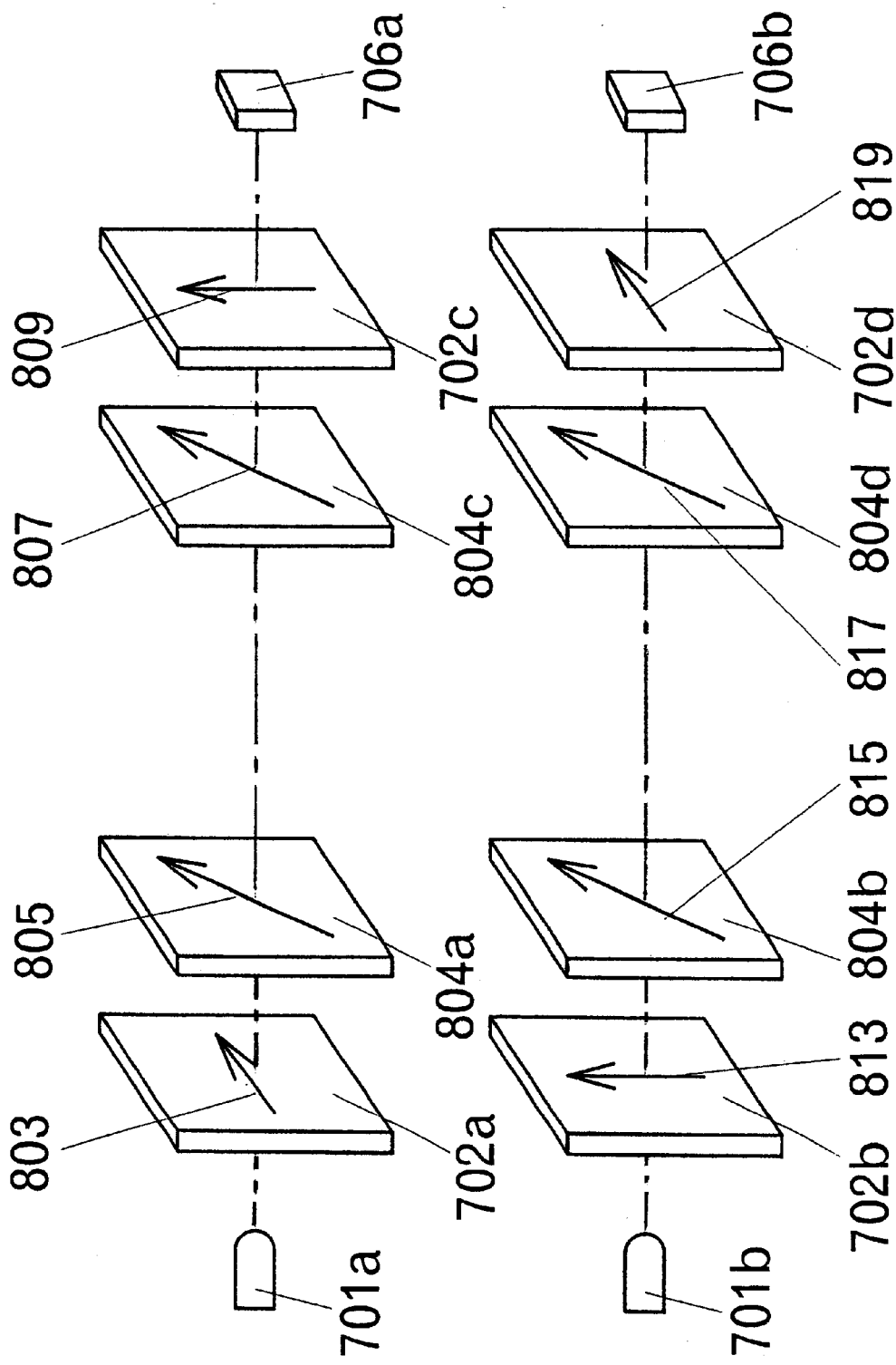
FIG. 8 is a structural drawing of a spatial optical transmitter according to a fifth embodiment of the present invention.

FIG. 8 is a schematic structural drawing of a spatial optical transmitter in a fifth embodiment of the present invention.

In the drawing, symbol 701a shows a light-emitting diode as an electrooptic conversion means, 802a does a polarizer (corresponding to a first polarizer of the present invention), 803 does a polarization axis of the polarizer 802a, 804a does a λ/4 plate as a linearly-polarized polarized light/circularly-polarized light conversion mean (a first linearly-polarized light/cicrularly-polarized light conversion mean), 805 does a lag axis of λ/4 plate 804a, 804c does a λ/4 plate as a cicrularly-polarized light/linearly-polarized light conversion mean (a first circularly-polarized light/linearly-polarized light conversion mean), 807 does a lag axis of λ/4 plate 804c, 702c does the analyzer (a first analyzer), 809 does a polarization axis of the analyzer 702c, 706a does the photodiode as the photoelectric conversion means, 701b does the light-emitting diode as the electrooptic conversion means, 702b does the polarizer (a second polarizer), 813 does a polarization axis of the polarizer 702b, 804b does a λ/4 plate as a linearly-polarized light/circularly-polarized light conversion mean (a second linearly-polarized light/ circularly-polarized light conversion mean), 815 does a lag axis of λ/4 plate 804b, 804d does a λ/4 plate as a circularly-polarized light/linearly-polarized light conversion means, 817 does a lag axis of λ/4 plate 804d, 702d does the analyzer (a second analyzer), 819 does a polarization axis of the analyzer 702d, and 706b does the photodiode as the photoelectric conversion means.

Here, an angle of the lag axis of the first linearly-polarized light/circularly-polarized light conversion mean to the polarization axis of the first polarizer is 45° (or 315°) with facing in the proceeding direction of the light, and an angle of the polarization axis of the fist analyzer to the lag axis of the first circularly-polarized light/linearly-polarized light conversion mean is 45° (or 315°) with facing in the proceeding direction of the light. In addition, an angle of the lag axis of the second linearly-polarized light/circularly-polarized light conversion mean to the polarization axis of the second polarizer is 315° (or 45°) with facing in the proceeding direction of the light, and an angle of the polarization axis of the second analyzer to the lag axis of the second circularly-polarized light/ linearly-polarized light conversion mean is 315° (or 45°) with facing in the proceeding direction of the light.

In the above structure, next, operation of this embodiment will be described.

Thus, an electric signal applied to the light-emitting diode 801 is converted into light. Although the polarized directions of this light do not coincide, the light after passing through the polarizer 802a becomes linearly-polarized light since the polarizer 802a passes only the light the electric field of which vibrates in the direction of the polarization axis 803. If the linearly-polarized light passes through the λ/4 plate 804c, an electric field component in the direction of the lag axis 805 is delayed by λ/4 (¼ of the wavelength) in comparison with an electric field component in a phase-advanced axis that is orthogonal to it, and hence, as shown in FIG. 2, the linearly-polarized light incident to the plate 804c in the state that an angle of its polarization axis to the lag axis 805 of the λ/4 plate 804c is 45° is circularly polarized clockwise with facing in the proceeding direction of the light.

On the other hand, the electric signal applied to the light-emitting diode 701b is converted into light. Although the polarized directions of this light do not coincide, the light after passing through the polarizer 702b becomes linearly-polarized light since the polarizer 702b passes only the light the electric field of which vibrates in the direction of the polarization axis 813. If the linearly-polarized light passes through the λ/4 plate 804d, an electric field component in the direction of the lag axis 815 is delayed by λ/4 (¼ of the wavelength) in comparison with an electric field component in a phase-advanced axis that is orthogonal to it, and hence, as shown in the drawing, the linearly-polarized light incident to the plate 804d in the state that an angle of its polarization axis to the lag axis 815 of the λ/4 plate 804d is 45° is circularly polarized counterclockwise with facing in the proceeding direction of the light.

The clockwise circularly-polarized light incident to the λ/4 plate 804c that is spatially transmitted is converted into linearly-polarized light the vibration direction of the electric field of which is vertical in the drawing and passes through the analyzer 702c, but the counterclockwise circularly-polarized light incident to the λ/4 plate 804c is converted into linearly-polarized light the vibration direction of the electric field of which is horizontal in the drawing and hence does not pass through the analyzer 702c. On the contrary, the counterclockwise circularly-polarized light incident to the λ/4 plate 804d is converted into linearly-polarized light the vibration direction of the electric field of which is horizontal in the drawing and passes through the analyzer 702d, but the clockwise circularly-polarized light is converted into linearly-polarized light the vibration direction of the electric field of which is vertical in the drawing and hence does not pass through the analyzer 702d.

Since optical axes of the light-emitting diode 801 and photodiode 706a, and optical axes of the light-emitting diode 701b and photodiode 706b coincide respectively, the light from them does not interfere with each other if the light is parallel light. Nevertheless, actually, it is difficult to make the optical axes completely coincide due to an installation error and the like, and it is difficult to obtain completely parallel light even with using a lens or a concave mirror if a laser is not used. Furthermore, it is necessary to carefully handle the laser since it had better being avoided that the laser light directly enters an eye in case laser light is spatially emitted. In addition, although it is good to make two optical axes close so as to make a device compact, interference of the light becomes more remarkable if the device is a conventional one.

Nevertheless, in this embodiment, even if the light passing through the polarizer 802a interferes with the light passing through the polarizer 702b, the interfered light is cut off by the analyzers 804c and 804d since respective polarized directions are orthogonal to each other. Therefore, the electric signal applied to the light-emitting diode 801 and the electric signal applied to the light-emitting diode 701b are transmitted respectively to the photodiode 706a and photodiode 706b without interfering with each other. This is possible to make two optical axes extremely close, hence is possible to multiplex two signals and to make the transmission band width of the data signal twice.

SIXTH EMBODIMENT

Figure 9:
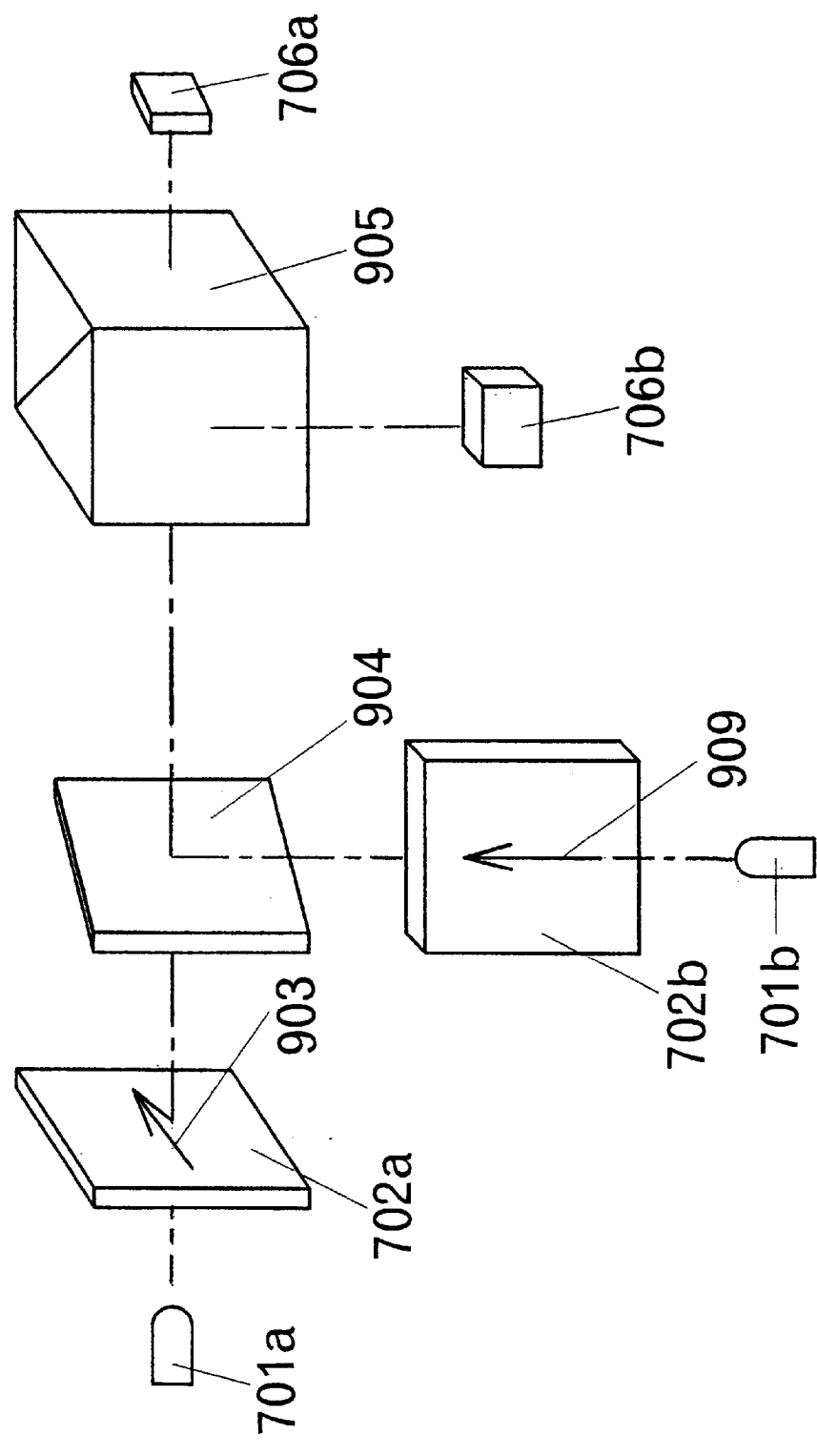
FIG. 9 is a structural drawing of a spatial optical transmitter according to a sixth embodiment of the present invention.

Is a schematic structural drawing of a spatial optical transmitter in a sixth embodiment of FIG. 9 the present invention.

In the drawing, symbol 701a shows the light-emitting diode as the electrooptic conversion means, 702a does the polarizer, 903 does a polarization axis of the polarizer 702a, 904 does a half mirror as a beam-synthesizing means, 905 does a polarized-beam splitter as a polarized-beam-splitting means, 706a does the photodiode as the photoelectric conversion means, 701b does the light-emitting diode as the electrooptic conversion means, 702b does the polarizer, 909 does a polarization axis of the polarizer 702b, and 706b does the photodiode as the photoelectric conversion means.

In the above structure, next, operation of this embodiment will be described.

Thus, an electric signal applied to the light-emitting diode 701a is converted into light. Although the polarized directions of this light do not coincide, the light after passing through the polarizer 702a becomes linearly-polarized light since the polarizer 702a passes only the light the electric field of which vibrates in the direction of the polarization axis 903. On the other hand, the electric signal applied to the light-emitting diode 701b is converted into light. Although the polarized directions of this light do not coincide, the light after passing through the polarizer 702b becomes linearly-polarized light since the polarizer 702b passes only the light the electric field of which vibrates in the direction of the polarization axis 909, and the light is synthesized with a polarized beam from the polarizer 903, which has the polarize direction orthogonal to that of the light, by the half mirror 904 to be spatially transmitted and to enter into the polarized-beam splitter 905. The polarized beam component from the polarizer 903 in the synthesized light incident to the polarized-beam splitter 905 passes to the photodiode 706a to be converted into an electric signal. The polarized beam component from the polarizer 702b is reflected by the polarized-beam splitter and reaches the photodiode 706b to be converted into an electric signal.

Thus, this embodiment comprises the polarizers 702a and 702b converting two lines of electric signals into polarized beams that are orthogonal to each other, the half mirror 904 multiplexing and spatially transmitting those two lines of light signals on the practically same optical axis, the polarized-beam splitter 905 splitting respective polarized-beam components, and photodiodes 706a and 706b converting those split optical signals into electric signals, can get rid of mutual interference of the two lines of optical signals owing to this, and can secure twice the transmission band in the same transmission space.

In this manner, this invention can transmit and multiplex two signals and make the transmission band width of the data signal twice.

SEVENTH EMBODIMENT

Figure 10:
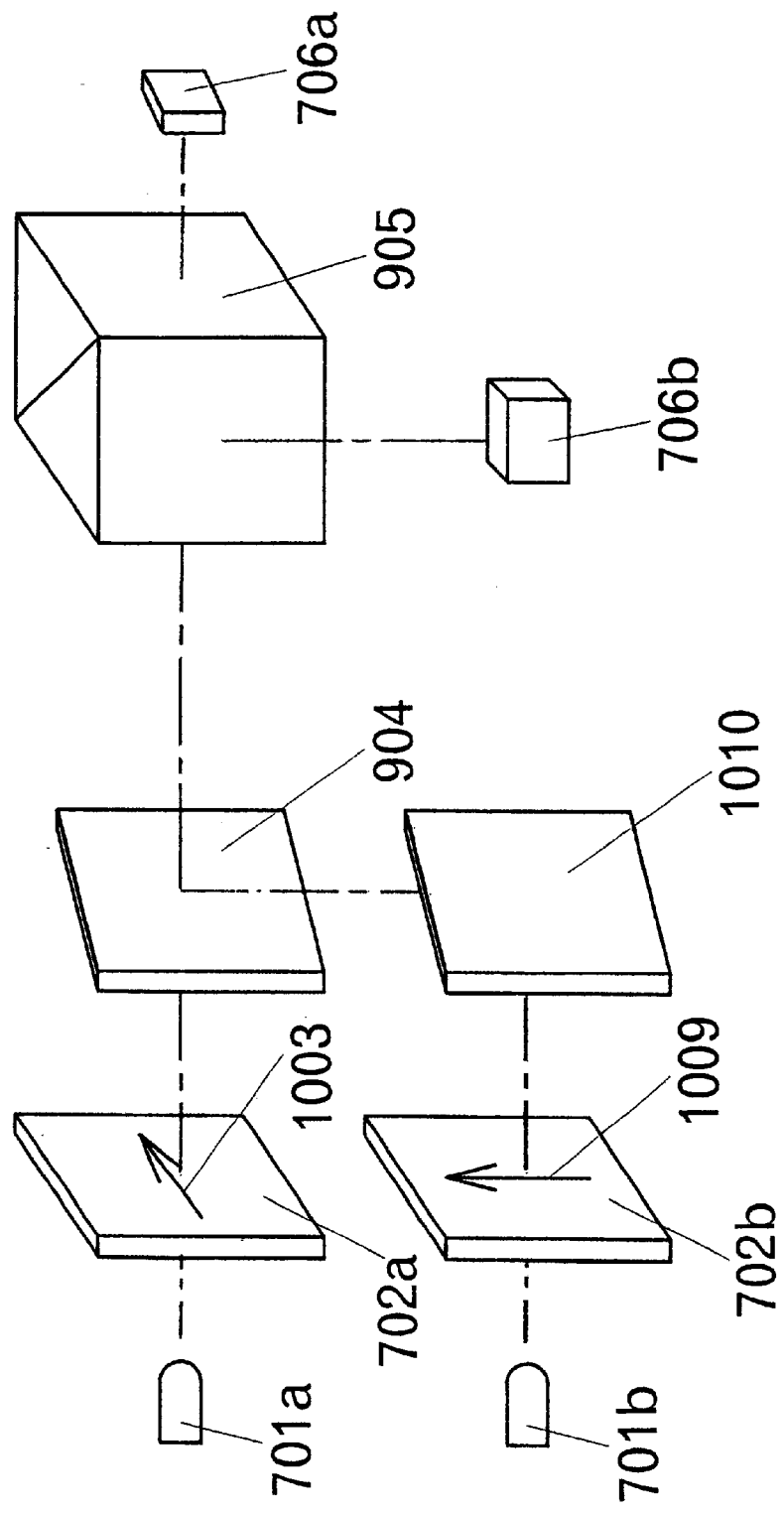
FIG. 10 is a structural drawing of a spatial optical transmitter according to a seventh embodiment of the present invention.

Is a schematic structural drawing of a spatial optical transmitter in a seventh, embodiment of FIG. 10 the present invention.

In the drawing, symbol 701a shows the light-emitting diode as the electrooptic conversion means, 702a does the polarizer, 1003 does a polarization axis of the polarizer 702a, 904 does the half mirror as the beam-synthesizing means, 905 does the polarized-beam splitter as the polarized-beam-splitting means, 706a does the photodiode as the photoelectric conversion means, 701b does the light-emitting diode as the electrooptic conversion means, 702b does the polarizer, a polarization axis of the polarizer 1009, 1010 does a total reflection mirror, and 706b does the photodiode as the photoelectric conversion means.

In the above structure, next, operation of this embodiment will be described.

Thus, an electric signal applied to the light-emitting diode 701a is converted into light. Although the polarized directions of this light do not coincide, the light after passing through the polarizer 702a becomes linearly-polarized light since the polarizer 702a passes only the light vibrating in the direction of the polarization axis 1003. On the other hand, the electric signal applied to the light-emitting diode 701b is converted into light. Although the polarized directions of this light do not coincide, the light after passing through the polarizer 702b becomes linearly-polarized light since the polarizer 702b passes only the light vibrating in the direction of the polarization axis 1009. Further, the light is reflected by the total reflection mirror 1010, and is synthesized with a polarized beam from the polarizer 1003, which has the polarize direction orthogonal to that of the light, by the half mirror 904 to be spatially transmitted and to enter into the polarized-beam splitter 905. The polarized-beam component from the polarizer 1003 in the synthesized light incident to the polarized-beam splitter 905 passes to the photodiode 706a to be converted into an electric signal. The polarized beam component from the polarizer 1009 is reflected by the polarized-beam splitter and reaches the photodiode 706b to be converted into an electric signal.

In this manner, this embodiment can transmit and multiplex two signals, and make the transmission band width of the data signal twice.

EIGHTH EMBODIMENT

Figure 11:
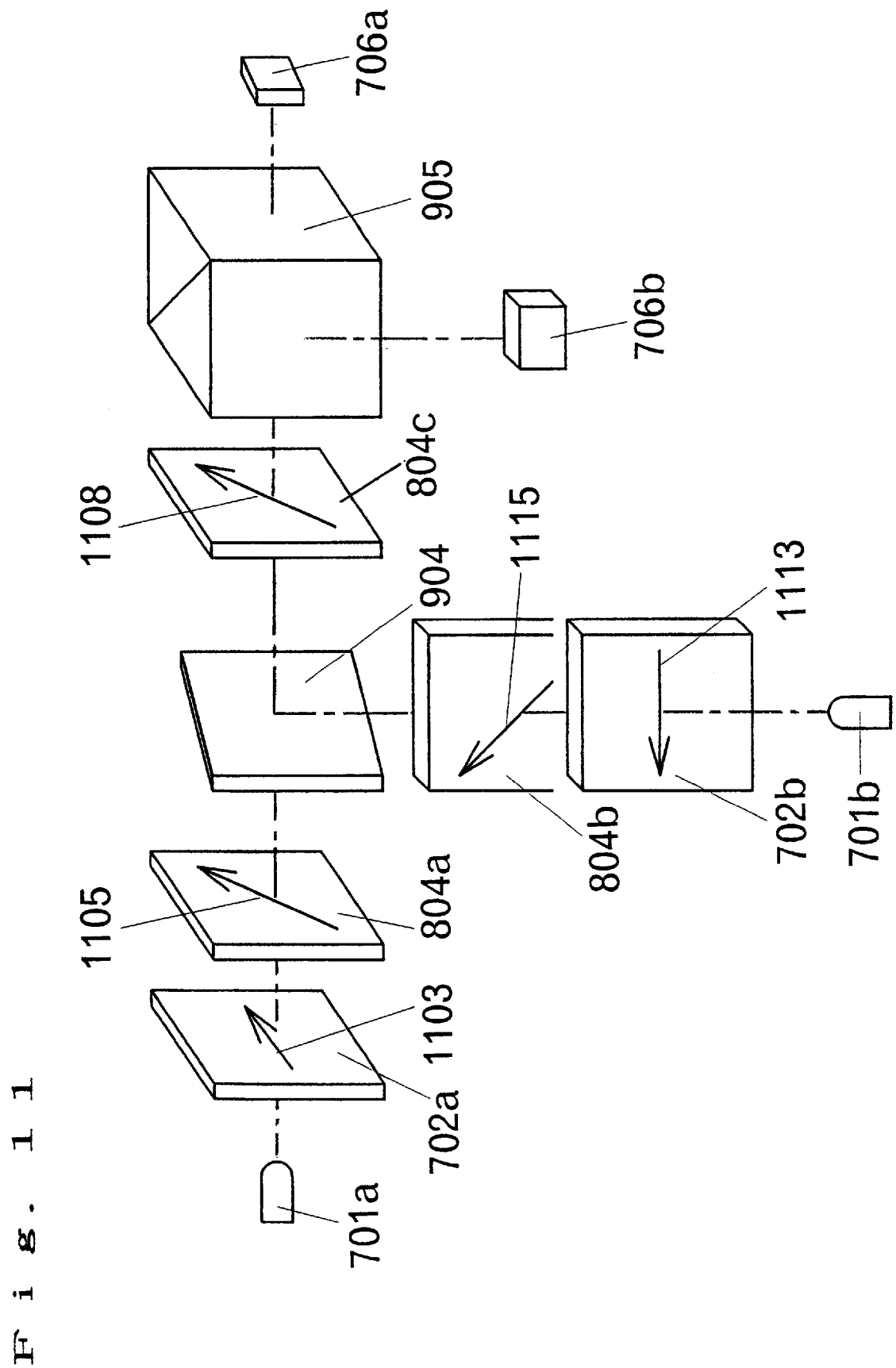
FIG. 11 is a structural drawing of a spatial optical transmitter according to an eighth embodiment of the present invention.

FIG. 11 is a schematic structural drawing of a spatial optical transmitter in an eighth embodiment of the present invention.

In the drawing, symbol 701a shows the light-emitting diode as the electrooptic conversion means, 701b does the polarizer (a first polarizer of the present invention), 1103 does a polarization axis of the polarizer 701b, 804a does the λ/4 plate as the linearly-polarized light/circularly-polarized light conversion mean (a first linearly-polarized light/ circularly-polarized light conversion mean), 1105 does a lag axis of the λ/4 plate 804a, 904 is the half mirror as the beam-synthesizing means, 804c does the λ/4 plate as the circularly-polarized light/linearly-polarized light conversion means, 1108 does a lag axis of the λ/4 plate 804c, 905 does the polarized-beam splitter as the polarized-beam-splitting means, 706a does the photodiode as the photoelectric conversion means, 701b does the light-emitting diode as the electrooptic conversion means, 702b does the polarizer (a second polarizer), 1113 does a polarization axis of the polarizer 702b, 804b does the λ/4 plate as the linearly-polarized light/circularly-polarized light conversion mean (a second linearly-polarized light/circularly-polarized light conversion mean), 1115 does a lag axis of λ/4 plate 804b, and 706b does the photodiode as the photoelectric conversion means.

Here, an angle of the lag axis of the first linearly-polarized light/circularly-polarized light conversion mean to the polarization axis of the first polarizer is 45° (or 315°) with facing in the proceeding direction of the light, and an angle of the lag axis of the second linearly-polarized light/cicrularly-polarized light conversion mean to the polarization axis of the second polarizer is 45° (or 315°) with facing in the proceeding direction of the light.

An electric signal applied to the light-emitting diode 701a is converted into light. Although the polarized directions of this light do not coincide, the light after passing through the polarizer 701b becomes linearly-polarized light since the polarizer 701b passes only the light the electric field of which vibrates in the direction of the polarization axis 1103. If the linearly-polarized light passes through the λ/4 plate 804a, an electric field component in the direction of the phase-advancing axis 1105 is delayed by λ/4 (¼ of the wavelength) in comparison with an electric field component in a phase-advanced axis that is orthogonal to it, and hence, as shown in the drawing, the linearly-polarized light incident to the plate 804a in the state that an angle of its polarization axis to the lag axis 1105 of the λ/4 plate 804a is 45° is circularly polarized clockwise with facing in the proceeding direction of the light.

On the other hand, the electric signal applied to the light-emitting diode 701b is converted into light. Although the polarized directions of this light do not coincide, the light after passing through the polarizer 702b becomes linearly-polarized light since the polarizer 702b passes only the light the electric field of which vibrates in the direction of the polarization axis 1113. If the linearly-polarized light passes through the λ/4 plate 804b, an electric field component in the direction of the lag axis 1115 is delayed by λ/4 (¼ of the wavelength) in comparison with an electric field component in a phase-advanced axis that is orthogonal to it, and hence, as shown in the drawing, the linearly-polarized light incident to the plate 804b in the state that an angle of its polarization axis to the phase-advancing axis 1115 of the λ/4 plate 804b is 45° is circularly polarized clockwise with facing in the proceeding direction of the light.

Furthermore, the circularly-polarized light from the λ/4 plate 804a, which is in the rotational direction as it is, and the circularly polarized light from the λ/4 plate 804b, which becomes in the reverse rotation, are synthesized by the half mirror 904. The clockwise circularly-polarized light incident to the λ/4 plate 804c that is spatially transmitted is converted into linearly-polarized light the electric field of which has an angle of 315° (vertical in the drawing) with facing in the proceeding direction of the light to the lag axis 1108, but the counterclockwise circularly-polarized light incident to the λ/4 plate 804c is converted into linearly-polarized light the electric field of which has an angle of 45° (horizontal in the drawing) with facing in the proceeding direction of the light to the lag axis 1108, and both of the light enter into the polarized-beam splitter 905. Therefore, the polarized-light component from the light-emitting diode 701b passes and reaches the photodiode 706a to be converted into an electric signal. The polarized-light component from the light-emitting diode 701a is reflected by the polarized-beam splitter and reaches the photodiode 706b to be converted into an electric signal. In this manner, in the present invention, it is possible to transmit and multiplex two signals on one optical axis and to make the transmission band width of the data signal twice.

NINTH EMBODIMENT

Figure 12:
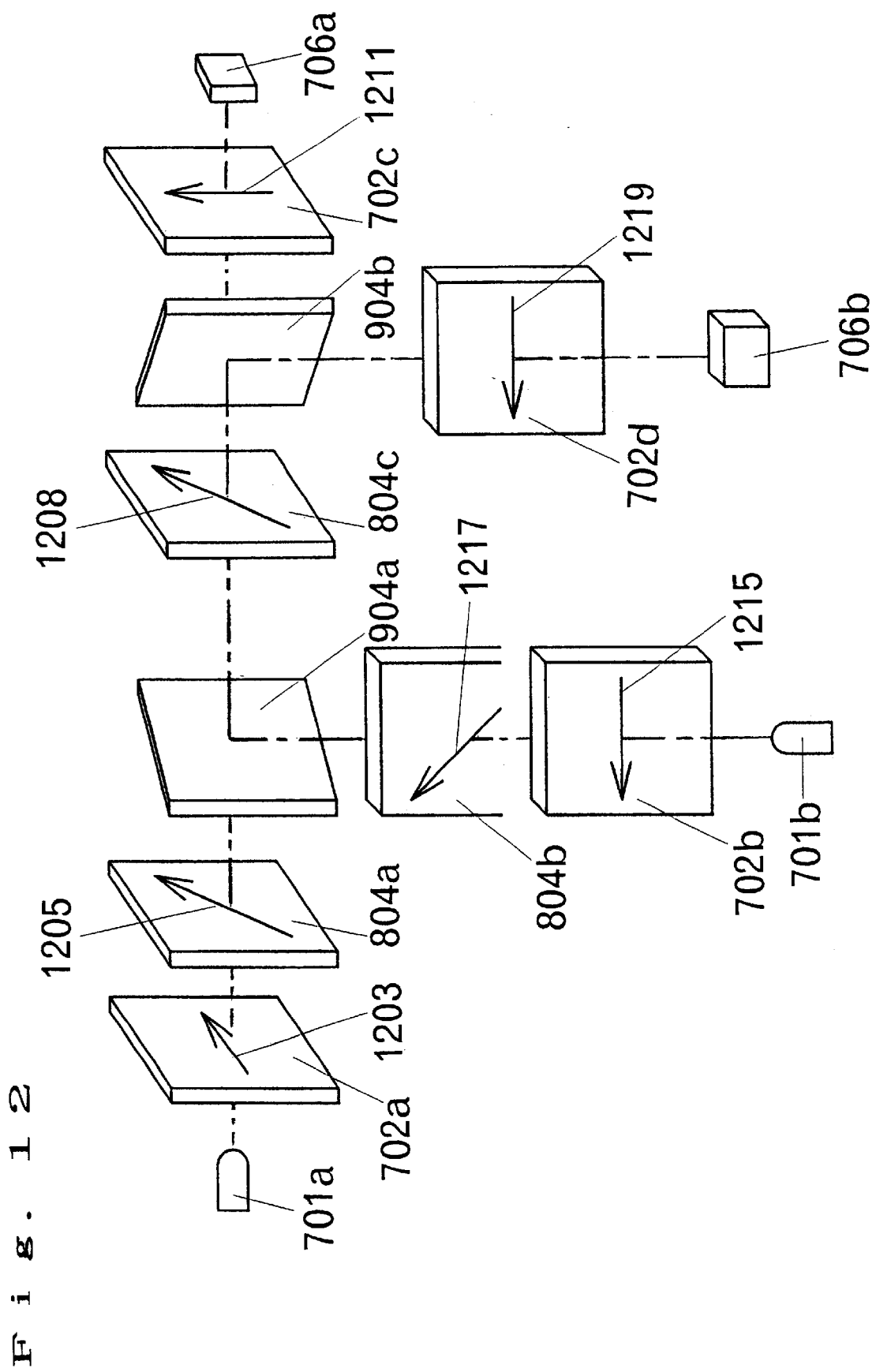
FIG. 12 is a structural drawing of a spatial optical transmitter according to a ninth embodiment of the present invention.

FIG. 12 is a schematic structural drawing of a spatial optical transmitter in a ninth embodiment of the present invention.

In the drawing, symbol 701a shows the light-emitting diode as the electrooptic conversion means, 702a does the polarizer (a first polarizer), 1203 does a polarization axis of the polarizer 702a, 804a does the λ/4 plate as the linearly-polarized light/circularly-polarized light conversion mean (a first linearly-polarized light/circularly-polarized light conversion mean), 1205 does a lag axis of the λ/4 plate 804a, 904a is a half mirror as a beam-synthesizing means, 804c does the λ/4 plate as the circularly-polarized light/linearly-polarized light conversion means, 1208 does a lag axis of the λ/4 plate 804c, 904b is a half mirror as a beam-synthesizing means, 702c does the analyzer, 1211 does a polarization axis of the 702c analyzer, 706a does the photodiode as the photoelectric conversion means, 701b does the light-emitting diode as the electrooptic conversion means, 702b does the polarizer (a second polarizer), 1215 does a lag axis of λ/4 plate 702b, 804b is the λ/4 plate as the linearly-polarized light/circularly-polarized light conversion mean (a second linearly-polarized light/circularly-polarized light conversion mean), 1217 is a lag axis of the λ/4 plate 804b, 702d is the analyzer, 1219 does a polarization axis of the 702d analyzer, and 706b does the photodiode as the photoelectric conversion means.

Here, an angle of the lag axis of the first linearly-polarized light/circularly-polarized light conversion mean to the polarization axis of the first polarizer is 45° (or 315°) with facing in the proceeding direction of the light, and an angle of the lag axis of the second linearly-polarized light/cicrularly-polarized polarized light conversion mean to the polarization axis of the second polarizer is 45° (or 315°) with facing in the proceeding direction of the light.

In the above structure, next, operation of this embodiment will be described.

Thus, an electric signal applied to the light-emitting diode 701a is converted into light. Although the polarized directions of this light do not coincide, the light after passing through the polarizer 702a becomes linearly-polarized light since the polarizer 702a passes only the light the electric field of which vibrates in the direction of the polarization axis 1203. If the linearly-polarized light passes through the λ/4 plate 804a, an electric field component in the direction of the lag axis 1205 is delayed by λ/4 (¼ of the wavelength) in comparison with an electric field component in a phase-advanced axis that is orthogonal to it, and hence, as shown in FIG. 12, the linearly-polarized light incident to the plate 804a in the state that an angle of its polarization axis to the lag axis 1205 of the λ/4 plate 804a is 45° is circularly polarized clockwise with facing in the proceeding direction of the light. On the other hand, the electric signal applied to the light-emitting diode 701b is converted into light. Although the polarized directions of this light do not coincide, the light after passing through the polarizer 702b becomes linearly-polarized light since the polarizer 702b passes only the light the electric field of which vibrates in the direction of the polarization axis 1215. If the linearly-polarized light passes through the λ/4 plate 804b, an electric field component in the direction of the lag axis 1217 is delayed by λ/4 (¼ of the wavelength) in comparison with an electric field component in a phase-advanced axis that is orthogonal to it, and hence, as shown in the drawing, the linearly-polarized light incident to the plate 804b in the state that an angle of its polarization axis to the lag axis 1217 of the λ/4 plate 804b is 45° is circularly polarized clockwise with facing in the proceeding direction of the light.

Furthermore, the circularly polarized light from the λ/4 plate 804a, which is in the rotational direction as it is, and the circularly polarized light from the λ/4 plate 804b, which becomes in the reverse rotation, are synthesized by the half mirror 904a. The clockwise circularly-polarized light incident to the λ/4 plate 804c that is spatially transmitted is converted into linearly-polarized light the electric field of which has an angle of 315° (vertical in the drawing) with facing in the proceeding direction of the light to the lag axis 1208, but the counterclockwise circularly-polarized light component is converted into linearly-polarized light the electric field of which has an angle of 45° (horizontal in the drawing) with facing in the proceeding direction of the light to the lag axis 1208. These polarized beams are split into transmitted light and reflected light on the half-mirror 904b. The transmitted light reaches the analyzer 702c, which passes only the component whose electric field vibrates in the direction of the polarization axis 1211. Thus, this, only the light emitted by the light-emitting diode 701a reaches the photodiode 706a and is converted into an electric signal. The reflected light reaches the analyzer 702d, which passes only the component whose electric field vibrates in the direction of the polarization axis 1219. Thus, this, only the light emitted by the light-emitting diode 701b reaches the photodiode 706b and is converted into an electric signal.

In this manner, in the present invention, it is possible to transmit and multiplex two signals on one optical axis and to make the transmission band width of the data signal twice.

TENTH EMBODIMENT

Figure 13:
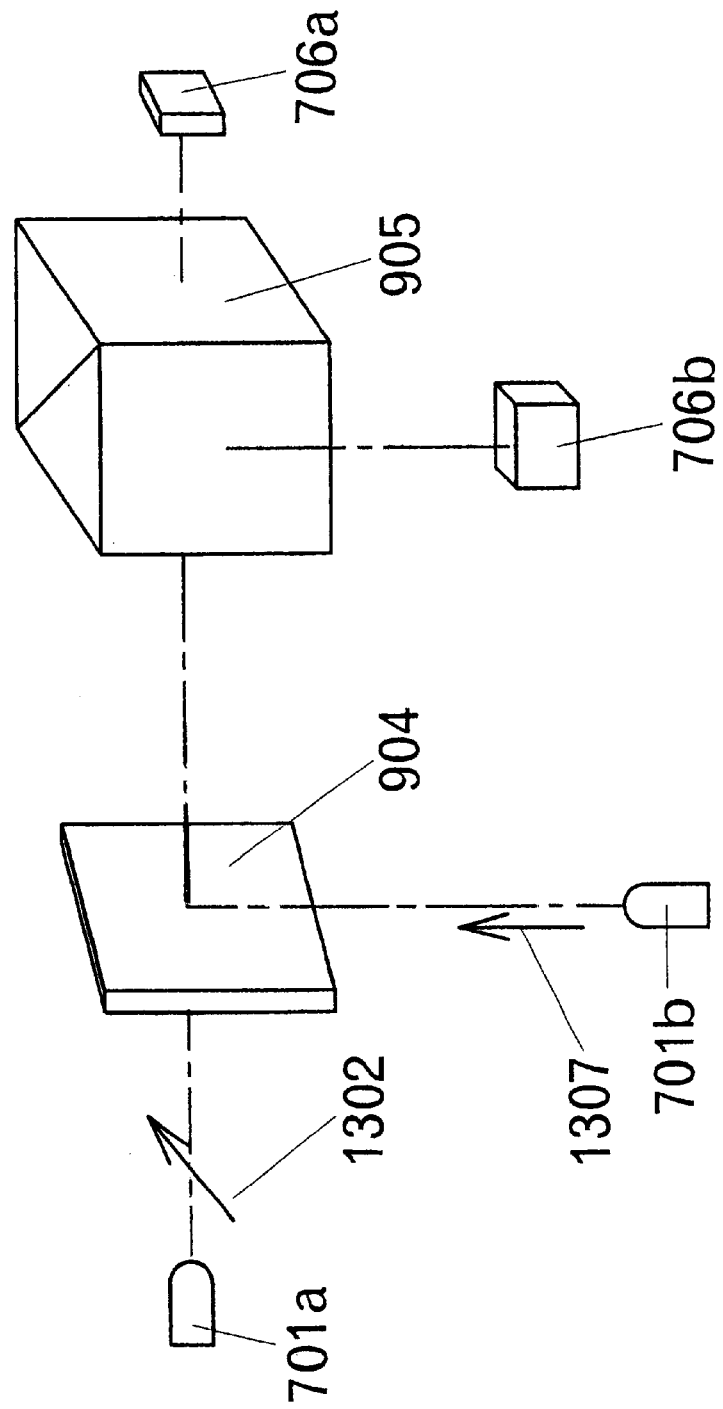
FIG. 13 is a structural drawing of a spatial optical transmitter according to a tenth embodiment of the present invention.

FIG. 13 is a schematic structural drawing of a spatial optical transmitter in a tenth embodiment of the present invention.

In the drawing, symbol 701a shows the laser diode as the electrooptic conversion means, 1302 does a polarization axis of the laser diode 701a, 904 is the half mirror as the beam-synthesizing means, 905 does the polarized-beam splitter as the polarized-beam-splitting means, 706a does the photodiode as the photoelectric conversion means, 701b does a laser diode as an electrooptic conversion means, 1307 does a polarization axis of the laser diode 701b, and 706b does the photodiode as the photoelectric conversion means.

The electric signal applied to the laser diode 701a is converted into a linearly-polarized light the electric field of which vibrates in the direction of the polarization axis 1302. On the other hand, the electric signal applied to the laser diode 701b is converted into a linearly-polarized light the electric field of which vibrates in the direction of the polarization axis 1307, and further is synthesized with a polarized beam from the laser diode 701a, whose polarized direction is orthogonal to that of the light, by the half mirror 904 to be spatially transmitted and enter into the polarized-beam splitter 905. A polarized-beam component from the laser diode 701a in the synthesized light incident to the polarized-beam splitter 905 reaches the photodiode 706a and is converted into an electric signal. A polarized-beam component from the laser diode 701b is reflected by the polarized-beam splitter and reaches the photodiode 706b to be converted into an electric signal.

In this manner, in the present invention, it is possible to transmit and multiplex two signals on one optical axis and to make the transmission band width of the data signal twice.

ELEVENTH EMBODIMENT

Figure 14:
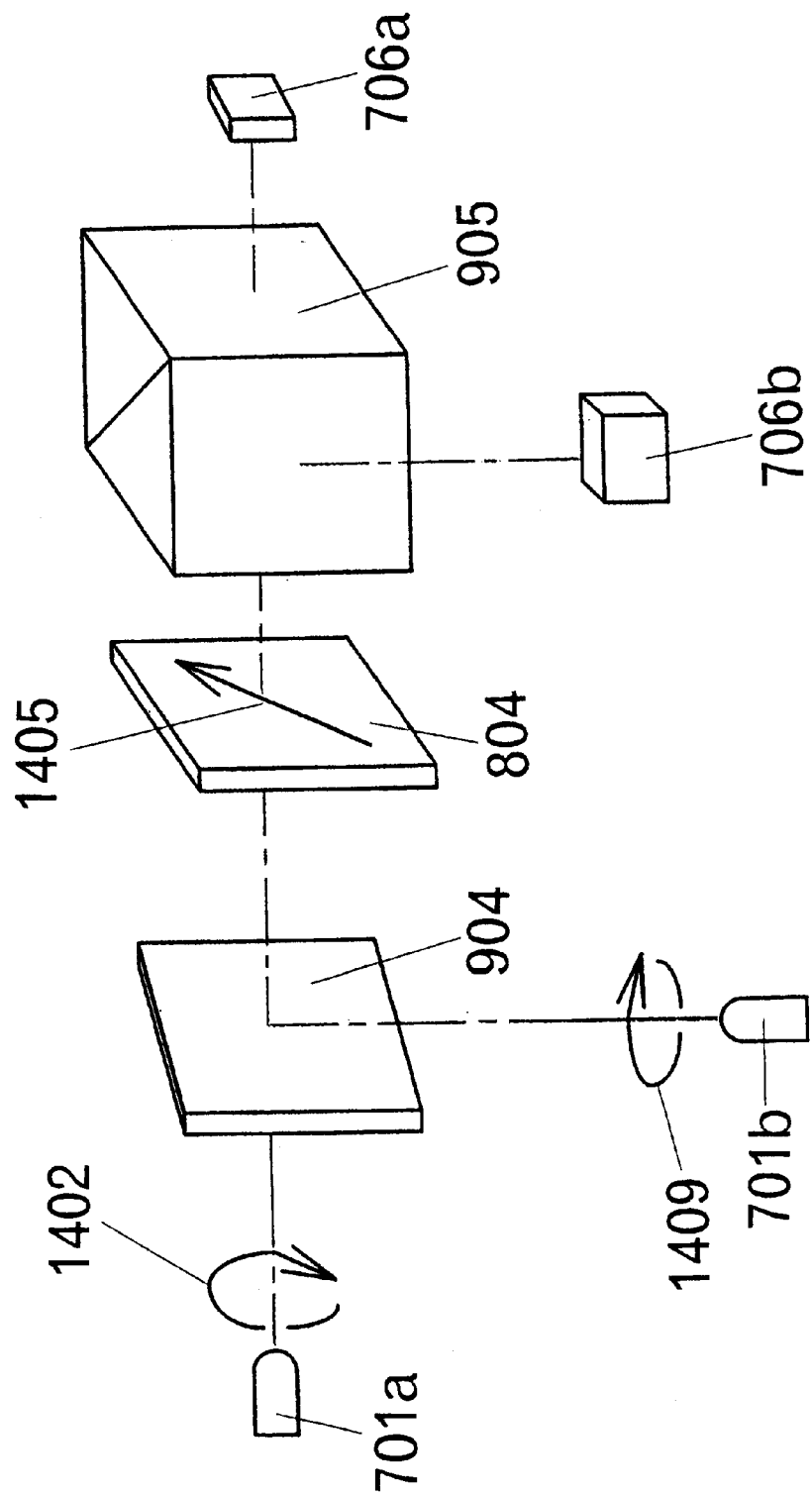
FIG. 14 is a structural drawing of a spatial optical transmitter according to an eleventh embodiment of the present invention.

FIG. 14 is a schematic structural drawing of a spatial optical transmitter in an eleventh embodiment of the present invention.

In the drawing, symbol 701a shows the laser diode as the electrooptic conversion means, 1402 does a rotational direction of a polarized beam of the laser diode 701a which is clockwise with facing in the proceeding direction of the light, 904 does the half mirror as the beam-synthesizing means, 804 does the λ/4 plate as the circularly-polarized light/linearly-polarized light conversion means, 1405 does a lag axis of the λ/4 plate 804, 905 does the polarized-beam splitter as the polarized-beam-splitting means, 706a does the photodiode as the photoelectric conversion means, 701b does the laser diode as the electricity/circularly-polarized light conversion means, 1409 does a rotational direction of the polarized beam of the laser diode 701b, which is clockwise with facing in the proceeding direction of the light, and 706b does the photodiode as the photoelectric conversion means.

The electric signal applied to the laser diode 701a is converted into circularly polarized light having the rotational direction 1402 of polarized light. On the other hand, the electric signal applied to the laser diode 701b is converted into circularly polarized light having the rotational direction 1402 of polarized light. Furthermore, the circularly polarized light from the laser diode 701a, which is in the rotational direction as it is, and the circularly polarized light from the laser diode 701b, which becomes in the reverse direction, are synthesized by the half mirror 904. The clockwise circularly-polarized light incident to the λ/4 plate 804 that is spatially transmitted is converted into linearly-polarized light the electric field of which has an angle of 315° (vertical in the drawing) with facing in the proceeding direction of the light to the lag axis 1405, but the counterclockwise circularly-polarized light component is converted into linearly-polarized light the electric field of which has an angle of 45° (horizontal in the drawing) with facing in the proceeding direction of the light to the lag axis 1405, and the synthesized light enters into the polarized-beam splitter 905. Therefore, the polarized-light component from the laser diode 701b in the synthesized light incident to the polarized-beam splitter 905 passes and reaches the photodiode 706a, and is converted into an electric signal. The polarized-light component from the laser diode 701a is reflected by the polarized-beam splitter, and reaches the photodiode 706b to be converted into an electric signal.

In this manner, in the present invention, it is possible to transmit and multiplex two signals on one optical axis and to make the transmission band width of the data signal twice.

TWELFTH EMBODIMENT

FIG. 15 is a schematic structural drawing of a spatial optical transmitter in a twelfth embodiment of the present invention.

17

The structure of this embodiment is a mixture of the ninth embodiment and second embodiment.

In the drawing, symbol 101 shows the LED driver, 701a does the light-emitting diode as the electrooptic conversion means, 702a does the polarizer, 1203 does the polarization axis of the polarizer 702a, 804a does the λ/4 plate as the linearly-polarized light/cicrularly-polarized light conversion means, 1205 does the lag axis of the λ/4 plate 804a, 904a is the half mirror as the beam-synthesizing means, 804c does the λ/4 plate as the circularly-polarized light/linearly-polarized light conversion means, 1208 does the lag axis of the λ/4 plate 804c, 904b is the half mirror as a beam slitting means, 702c does the analyzer, 1211 does the polarization axis of the 702c analyzer, 706a does the photodiode as the photoelectric conversion means, 701b does the light-emitting diode as the electrooptic conversion means, 702b does the polarizer, 1215 does the lag axis of λ/4 plate 702b, 804b is the λ/4 plate as the linearly-polarized light/circularly-polarized light conversion means, 1217 is the lag axis of the λ/4 plate 804b, 702d is the analyzer, 1219 does the polarization axis of the 702d analyzer, 706b does the photodiode as the photoelectric conversion means, 1501a does a receiver constructed by the components 104–112 and 313–316 in FIG. 3, and 1501b does the receiver constructed by the components 104–112 and 313–316 in FIG. 3.

In the above structure, next, operation of this embodiment will be described.

Thus, the serial data train 1 is amplified by the LED driver 101a and is applied to the light-emitting diode 701a. An electric signal applied is converted into light. Although the polarized directions of this light do not coincide, the light after passing through the polarizer 702a becomes linearly-polarized light since the polarizer 702a passes only the light the electric field of which vibrates in the direction of the polarization axis 1203. If the linearly-polarized light passes through the λ/4 plate 804a, an electric field component in the direction of the lag axis 1205 is delayed by λ/4 (¼ of the wavelength) in comparison with an electric field component in a phase-advanced axis that is orthogonal to it, and hence, as shown in FIG. 12, the linearly-polarized light incident to the plate 804a in the state that an angle of its polarization axis to the lag axis 1205 of the λ/4 plate 804a is 45° is circularly polarized clockwise with facing in the proceeding direction of the light.

On the other hand, the serial data train 2 is amplified by the LED driver 101b, and an electric signal applied to the light-emitting diode 701b is converted into light. Although the polarized directions of this light do not coincide, the light after passing through the polarizer 702b becomes linearly-polarized light since the polarizer 702b passes only the light the electric field of which vibrates in the direction of the polarization axis 1215.

If the linearly-polarized light passes through the λ/4 plate 804b, an electric field component in the direction of the lag axis 1217 is delayed by λ/4 (¼ of the wavelength) in comparison with an electric field component in a phase-advanced axis that is orthogonal to it, and hence, as shown in the drawing, the linearly-polarized light incident to the plate 804b in the state that an angle of its polarization axis to the lag axis 1217 of the λ/4 plate 804b is 45° is circularly polarized clockwise with facing in the proceeding direction of the light.

Furthermore, the circularly-polarized light from the λ/4 plate 804a, which is in the rotational direction as it is, and the circularly-polarized light from the λ/4 plate 804b, which becomes in the reverse rotation, are synthesized by the half mirror 904a. The clockwise circularly-polarized light incident to the λ/4 plate 804c that is spatially transmitted is converted into linearly-polarized light the electric-field of which has an angle of 315° (vertical in the drawing) with facing in the proceeding direction of the light to the lag axis 1208. In addition, the counterclockwise cicrularly-polarized light component is converted into linearly-polarized light the electric field of which has an angle of 45° (horizontal in the drawing) with facing in the proceeding direction of the light to the lag axis 1208. These polarized beams are split into the transmitted light and reflected light. The transmitted light reaches the analyzer 702c, which passes only the component whose electric field vibrates in the direction of the polarization axis 1211. Thus, this, only the light emitted by the light-emitting diode 701a reaches the photodiode 706a and is converted into an electric signal for the serial data train 1 to be reproduced by the receiver 1501a.

The reflected light reaches the analyzer 702d, which passes only the component whose electric field vibrates in the direction of the polarization axis 1219. Thus, this, only the light emitted by the light-emitting diode 701b reaches the photodiode 706b and is converted into an electric signal for the serial data train 2 to be reproduced by the receiver 1501b.

In this manner, in the present invention, it is possible to exceed the limitation of an LED and a photodiode that is the narrowest bottleneck in the high-speed optical transmission, further to transmit and multiplex two signals on one optical axis, and to largely widen the transmission band width of the data signal.

In addition, although, in the above-described respective embodiments, the case that the light is the light spatially emitted is described, the present invention is not limited to this, but the light transmitting inside an optical fiber also can be used. Even in this case, effects the same as those in the above-described embodiments are exhibited.

What is claimed is:

1. An optical receiver comprising photoelectric conversion means receiving an optical signal and converting the optical signal into an electric signal, signal edge detecting means of detecting edge information from said converted electric signal, a peak detector for detecting a peak level of the detected edge information from the signal edge detecting means, quantizing means generating a signal quantized on the basis of said detected edge signal, amplification factor changing means amplifying an output signal from said photoelectric conversion means with a predetermined amplification factor, and signal level detecting means of controlling said amplification factor on the basis of the peak level detected by the peak detector, wherein the output signal of said amplification factor changing means is inputted to said quantizing means.

2. An optical receiver comprising photoelectric conversion means receiving an optical signal and converting the optical signal into an electric signal, signal edge detecting means detecting edge information from said converted electric signal, quantizing means generating a signal quantized on the basis of said detected edge signal, amplification factor changing means amplifying an output signal from said photoelectric conversion means with a predetermined amplification factor, and signal level detecting means detecting a signal level of an output of said signal edge detecting means and controlling said amplification factor on the basis of the detection result, wherein the output signal of said amplification factor changing means is inputted to said quantizing means, and wherein said optical receiver comprises sampling means for sampling and outputting an output signal from said quantizing means using a clock signal generated.

3. In an optical receiver for receiving a serial data train including an optical pulse having a pulse width, a method for detecting the optical pulse comprising the steps of:

(a) converting the optical pulse into an analog signal;

(b) amplifying the analog signal of step (a); and detecting edges of the amplified analog signal;

(c) detecting a peak level of a detected edge, after detecting the respective edge in step (b);

(d) adjusting the amplification in step (b), after detecting the peak level in step (c);

(e) detecting a leading edge of the adjusted amplified analog signal of step (d);

(f) detecting a trailing edge of the adjusted amplified analog signal of step (d); and (g) quantizing the amplified analog signal between the leading edge detected in step (e) and the trailing edge detected in step (f);

wherein the quantized analog signal of step (g) restores the pulse width of is the optical pulse.

4. The method of claim 3 wherein step (e) includes:

(i) setting a threshold reference level;

(ii) determining when a voltage level of the detected leading edge exceeds the threshold reference level of step (i); and (iii) quantizing the leading edge of the pulse in response to step (ii).

* * * * *